US010420355B2

(12) United States Patent
Vulpitta et al.

(10) Patent No.: US 10,420,355 B2
(45) Date of Patent: Sep. 24, 2019

(54) SOFT FOOD AND BEVERAGE DISPENSER

(71) Applicant: TRV Dispense, LLC, Frisco, TX (US)

(72) Inventors: Tracy Vulpitta, Frisco, TX (US); Erwin Vulpitta, Frisco, TX (US); Scott Northuis, Otsego, MN (US); Mark Briski, Mequon, WI (US); Edgar Paffrath, Cedarburg, WI (US)

(73) Assignee: TRV Dispense, LLC, Frisco, TX (US)

( * ) Notice: Subject to any disclaimer, the term of this patent is extended or adjusted under 35 U.S.C. 154(b) by 0 days.

(21) Appl. No.: 16/002,192

(22) Filed: Jun. 7, 2018

(65) Prior Publication Data
US 2018/0289034 A1 Oct. 11, 2018

Related U.S. Application Data

(63) Continuation-in-part of application No. 15/281,943, filed on Sep. 30, 2016, now Pat. No. 10,017,371.
(Continued)

(51) Int. Cl.
*A23G 9/28* (2006.01)
*B67D 1/00* (2006.01)
*B67D 1/10* (2006.01)

(52) U.S. Cl.
CPC ............... *A23G 9/28* (2013.01); *B67D 1/00* (2013.01); *B67D 1/0001* (2013.01);
(Continued)

(58) Field of Classification Search
CPC ...... A23G 9/28; B67D 1/0001; B67D 1/0078; B67D 1/0004; B67D 1/108; B67D 1/00; B67D 2210/0016
See application file for complete search history.

(56) References Cited

U.S. PATENT DOCUMENTS 4,808,346 A   2/1989 Strenger
5,096,091 A   3/1992 Heu
(Continued)

FOREIGN PATENT DOCUMENTS

FR   1261579   5/1961
FR   1261580   5/1961
(Continued)

OTHER PUBLICATIONS

International Search Report for corresponding application PCT/US2014/065175 dated Feb. 11, 2015 (2 pages).
(Continued)

*Primary Examiner* — David P Angwin
*Assistant Examiner* — Bob Zadeh
(74) *Attorney, Agent, or Firm* — Harper Bates & Champion LLP; Scott L. Harper; Smitha Mathews

(57) ABSTRACT

A dispenser machine for storing and dispensing viscous foods and beverages and provides for the efficient and safe dispensation of a viscous food or beverage product that is contained in a flexible product container and which does not come into direct contact with the dispenser equipment. The dispenser includes an evacuation system which includes a weighted roller or slidable weight in contact with one or more sides of the product container and which operates by force of gravity to pressure and direct the food or beverage product contained in the container toward and out of the bag or container tube spout. A pump unit, which is configurable to provide for the dispensation of both food and beverage products with different viscosities by the addition or removal of one or pump pins, draws product from the container as desired and the pump unit pins operate to pinch and prevent the flow of product from the container tube spout after the pump is shut off.

17 Claims, 23 Drawing Sheets

Related U.S. Application Data which is a continuation-in-part of application No. 14/538,536, filed on Nov. 11, 2014, now Pat. No. 9,505,600.

(60) Provisional application No. 61/903,724, filed on Nov. 13, 2013.

(52) U.S. Cl.
CPC ......... *B67D 1/0004* (2013.01); *B67D 1/0078* (2013.01); *B67D 1/108* (2013.01); *B67D 2210/0016* (2013.01)

(56) References Cited

U.S. PATENT DOCUMENTS

| | | | |
|---|---|---|---|
| 5,249,706 A | 10/1993 | Szabo | |
| 5,490,613 A | 2/1996 | Taylor et al. | |
| 5,586,872 A * | 12/1996 | Skobelev | F04B 43/1253 417/477.8 |
| 5,593,067 A | 1/1997 | Shaw et al. | |
| 5,594,535 A | 1/1997 | Beaufort et al. | |
| 5,799,822 A | 9/1998 | Rudewicz et al. | |
| 5,803,317 A * | 9/1998 | Wheeler | B67D 1/0004 222/105 |
| 5,845,813 A | 12/1998 | Werner | |
| 5,875,930 A * | 3/1999 | Nakajima | B67D 1/0039 222/129.1 |
| 6,003,733 A | 12/1999 | Wheeler | |
| 6,016,935 A * | 1/2000 | Huegerich | B67D 1/0007 222/146.1 |
| 6,142,340 A | 11/2000 | Watanabe et al. | |
| 6,196,420 B1 * | 3/2001 | Gutierrez | B67D 1/0001 222/101 |
| 6,273,297 B1 | 8/2001 | Schalow et al. | |
| 6,345,734 B2 | 2/2002 | Schalow et al. | |
| 6,419,466 B1 * | 7/2002 | Lowe | A47J 31/402 417/417 |
| 6,662,971 B1 | 12/2003 | Nguyen et al. | |
| 6,691,894 B2 * | 2/2004 | Chrisman | B67D 1/0001 222/101 |
| 7,147,134 B2 | 12/2006 | Gutierrez et al. | |
| 7,603,834 B2 | 10/2009 | Schroeder et al. | |
| 8,360,278 B2 | 1/2013 | Fiedler | |
| 8,550,310 B2 | 10/2013 | Alstad et al. | |
| 8,678,236 B2 | 3/2014 | Burke et al. | |
| 9,505,600 B2 * | 11/2016 | Vulpitta | B67D 1/0001 |
| 10,017,371 B2 * | 7/2018 | Vulpitta | B67D 1/0001 |
| 2002/0092879 A1 * | 7/2002 | Chrisman | B67D 1/0001 222/504 |
| 2002/0179642 A1 * | 12/2002 | Gutierrez | B67D 1/0004 222/146.1 |
| 2003/0089740 A1 | 5/2003 | Gutierrez et al. | |
| 2004/0096126 A1 | 5/2004 | Danby et al. | |
| 2004/0216427 A1 | 11/2004 | Schroeder et al. | |
| 2005/0167444 A1 | 8/2005 | Sanfilippo et al. | |
| 2006/0254674 A1 | 11/2006 | Schroeder et al. | |
| 2006/0261086 A1 | 11/2006 | Schroeder et al. | |
| 2007/0029343 A1 | 2/2007 | Sanfilippo et al. | |
| 2007/0194045 A1 | 8/2007 | Py et al. | |
| 2008/0121662 A1 * | 5/2008 | Gehl | B67D 1/108 222/214 |
| 2008/0149664 A1 | 6/2008 | Schroeder et al. | |
| 2008/0169309 A1 | 7/2008 | Kroeger | |
| 2008/0290117 A1 | 11/2008 | Schroeder et al. | |
| 2009/0020559 A1 | 1/2009 | Sanfilippo et al. | |
| 2010/0301071 A1 | 12/2010 | Alstad et al. | |
| 2012/0104041 A1 | 5/2012 | Coleman et al. | |
| 2012/0248149 A1 * | 10/2012 | Pelfrey | B67D 1/108 222/214 |
| 2013/0269540 A1 | 10/2013 | Lazzarini et al. | |
| 2015/0129611 A1 | 5/2015 | Vulpitta et al. | |
| 2015/0315005 A1 * | 11/2015 | Corbelli | B67D 3/0067 222/95 |
| 2017/0015541 A1 * | 1/2017 | Vulpitta | B67D 1/0001 |

FOREIGN PATENT DOCUMENTS

| | | |
|---|---|---|
| WO | WO2014086816 A1 | 6/2014 |
| WO | WO2014086818 A1 | 6/2014 |

OTHER PUBLICATIONS

Canadian Intellectual Property Office Patent Examiner Requisition for corresponding application PCT/US2014/065175 dated Aug. 16, 2018 (4 pages).

Extended European search report for corresponding application PCT/US2014/065175 dated Jul. 21, 2017 (10 pages).

Written Opinion of the International Searching Authority for International application PCT/US2014/065175 dated Feb. 11, 2015 (8 pages).

International Search Report for corresponding application PCT/US2017/054241 dated Oct. 20, 2017 (2 pages).

Written Opinion of the International Searching Authority for International application PCT/US2017/054241 dated Oct. 20, 2017 (5 pages).

\* cited by examiner

SOFT FOOD AND BEVERAGE DISPENSER

CROSS-REFERENCE TO RELATED APPLICATIONS

This application is a continuation in part of U.S. patent application Ser. No. 15/281,943, filed Sep. 30, 2016 and entitled "Soft Food and Beverage Dispenser," which is a continuation in part of U.S. patent application Ser. No. 14/538,536, filed Nov. 11, 2014 and entitled "Soft Food and Beverage Dispenser," which claims the benefit of and priority to U.S. Provisional Application Ser. No. 61/903,724, filed on Nov. 13, 2013, each disclosure of which is incorporated herein by reference.

BACKGROUND OF THE INVENTION

Technical Field

The present invention relates to a machine for storing and dispensing a viscous product, and more particularly, a soft food or beverage product.

Description of Related Art

Frozen or refrigerated food, dessert and/or beverage dispensers, such as frozen ice cream and yogurt machines for example, are typically equipped with mechanical mixing and dispensing devices that mix ingredients together, or operate to keep the ingredients or product in a mixed and viscous condition for purposes of dispensation on an as needed basis. Such dispensers require a multitude of equipment and processes to formulate, heat or refrigerate, store and ultimately dispense the viscous beverage or product. In most typical dispensers, the actual food or beverage product is in contact with the mixing apparatus and in which the product is stored and dispensed which can lead to health and consumption hazards if such equipment and exposed components are not routinely and completely cleaned and sanitized. Additionally, the wear and tear on the equipment components and surfaces that are in contact with such food and beverage products over a period of repeated use leads to malfunction rendering the unit inoperable until repairs are made.

As a result, there remains a need in the art for an improved soft food and beverage dispenser that overcomes the limitations of existing food and beverage dispensers.

SUMMARY OF THE INVENTION

The present invention provides a dispenser machine for storing and dispensing food and beverage products that overcome the foregoing disadvantages existing in the art. The invention provides for the efficient and safe dispensation of a viscous or soft food or beverage product that is contained in a flexible container and separated from the dispenser equipment thereby preventing contact between the food or beverage product and the dispenser equipment. A dispenser cabinet is provided for housing the product container, dispensing and pump apparatus, and refrigeration and/or heating equipment. The product container containing the food or beverage product is secured within the dispenser cabinet for storage and dispensation as desired. In an embodiment, the dispenser includes an evacuation system which includes a roller or slidable weight in contact with one or more sides of the product container and which operates by force of gravity to apply pressure to and direct the food or beverage product contained in the product container toward a tube spout attached to the product container. A pump unit, which is configurable by the addition or removal of pump pins to provide for the dispensation of both food and beverage products with different viscosities, draws product from the container when the dispenser is activated. When the dispenser is deactivated, the pump unit stops and the one or more pump pins incorporated into the pump apparatus operate to pinch and prevent the flow of product from the container tube spout. When the product container is substantially empty, the user may simply remove the product container from the dispenser cabinet, throw away or recycle the used product container, and insert a new container with a food or beverage product into the dispenser for storage and dispensation.

A thermal heating and/or refrigeration system is provided to heat and/or cool and maintain the desired temperature of the food or beverage product stored in a product container within the interior of the dispenser cabinet. The thermal circuit system also provides heating or cooling to a thermal deck and thermal deck tube guide is provided, and operates to control and maintain the temperature of the product residing in the tube spout between dispensation operations.

In this respect, before explaining the invention in detail, it is to be understood that the invention is not limited in its application to the details of construction, dimensions or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting. To accomplish the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE FIGURES

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

Figure 1:
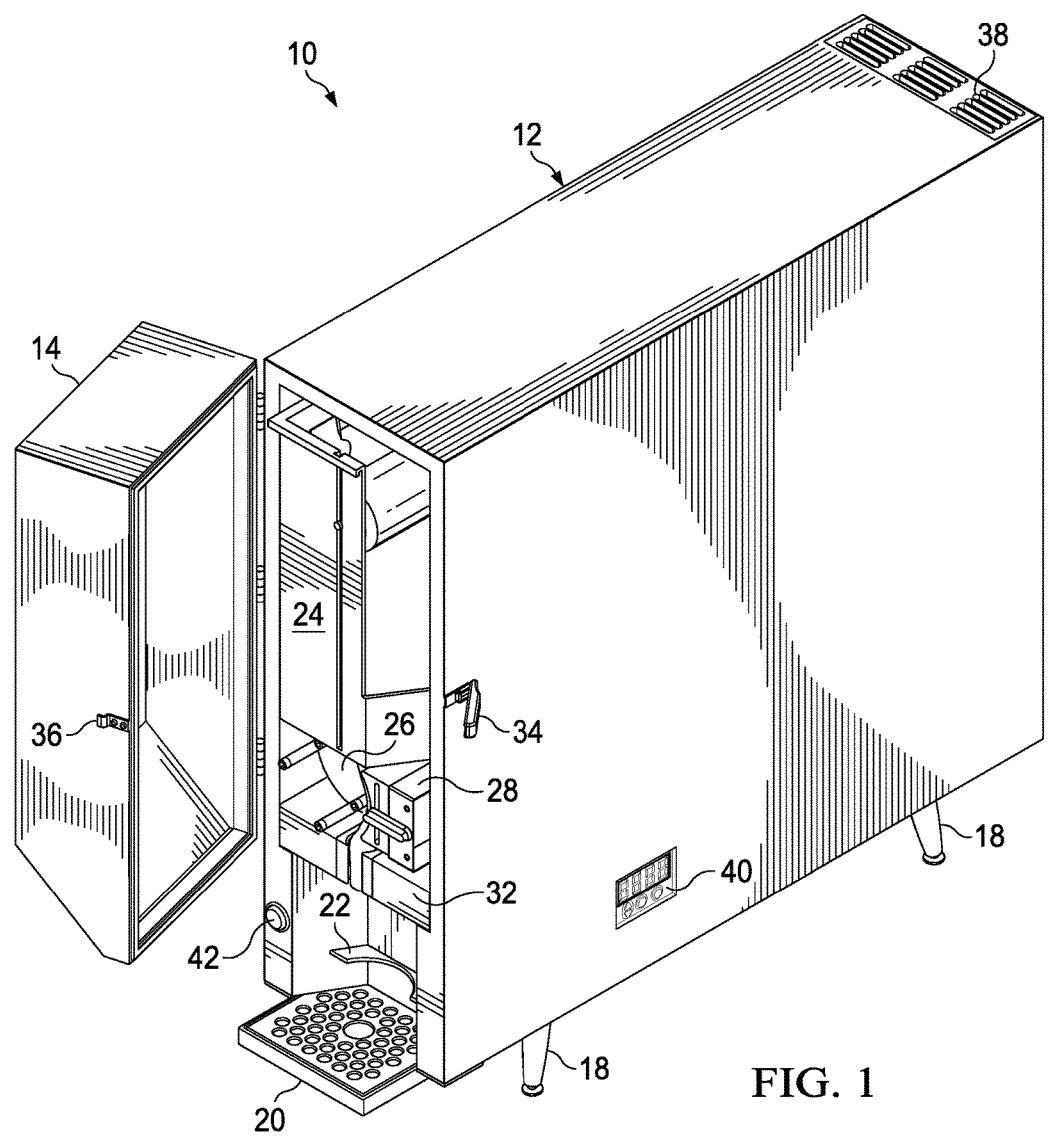
FIG. 1 shows a perspective view of an embodiment of a machine for storing and dispensing a soft food or beverage product according to the invention disclosed herein.
Figure 2:
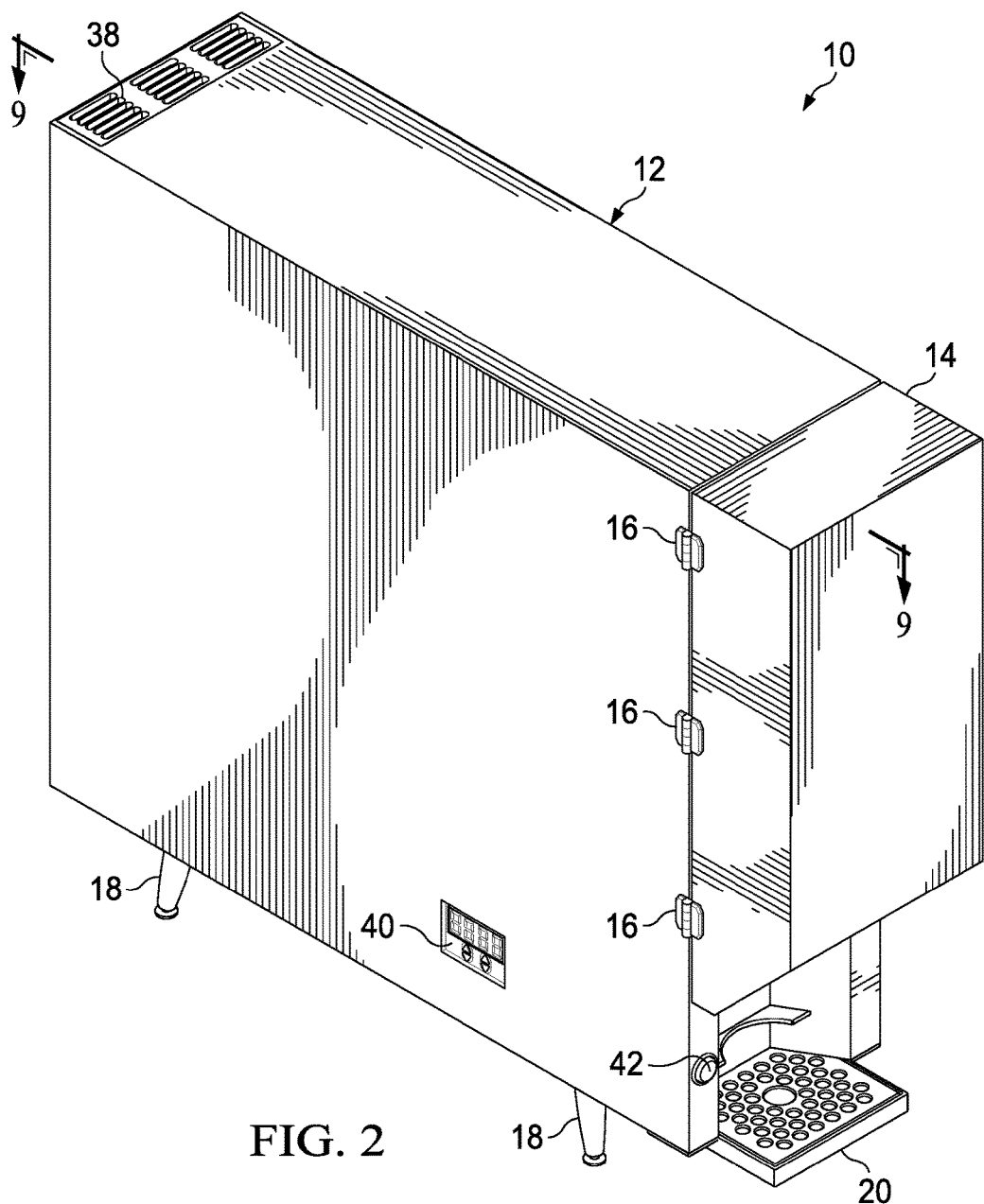
FIG. 2 is an opposite side perspective view of the machine for storing and dispensing a soft food or beverage product according to the invention disclosed herein.

Referring to the accompanying drawings, FIGS. 1 and 2 depict a soft food or beverage dispenser machine 10. The machine 10 includes a cabinet 12 having an exterior and interior portion separated by door 14 that is pivotably connected to an exterior surface of cabinet 12 with hinges 16. In the depicted embodiment, cabinet 12 and door 14 are comprised of thin gauge metal such as stainless steel sheet metal; however, other suitable materials may be used as known in the art. Cabinet 12 is supported by support legs 18 attached to the bottom of cabinet 12. A cup tray 20 and cup guide 22 are attached to the exterior of cabinet 12 for supporting a cup or container to be filled with product dispensed from a product container 44 enclosed within the interior portion of the machine 10 and for positioning the cup in a suitable location for the dispensed product to flow into the cup without overflowing the sides of the cup. Cup tray 20 and cup guide 22 are comprised of thin gauge metal such as stainless steel; however, other suitable materials utilized in the product of food and beverage dispensing equipment may be used as known in the art. In an embodiment, the external dimensions of cabinet 12 may be twelve inches wide by eighteen inches deep and twenty-inches in height, although these dimensions are not to be construed as limitations of the size of cabinet 12 which may be increased or decreased as desired by the user or dictated by the operating environment of machine 10. Machine 10 is configured to be electrically powered by conventional 110V electrical power and may be alternatively configured to work with different electrical power supply requirements found across various countries worldwide as generally known in the art.

Figure 3:
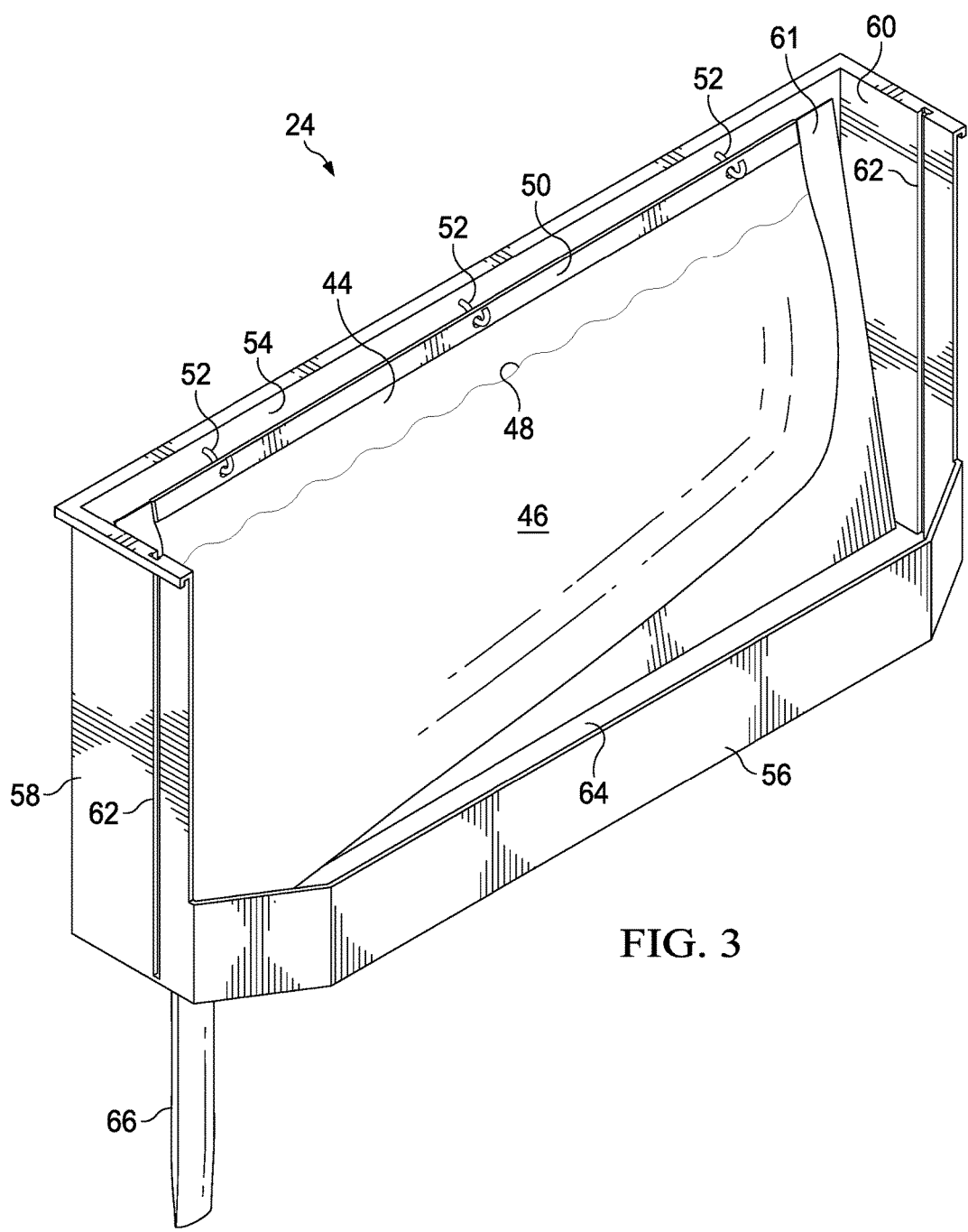
FIG. 3 is a perspective view of an embodiment of the product tray component of the dispensing machine according to the invention disclosed herein.
Figure 5:
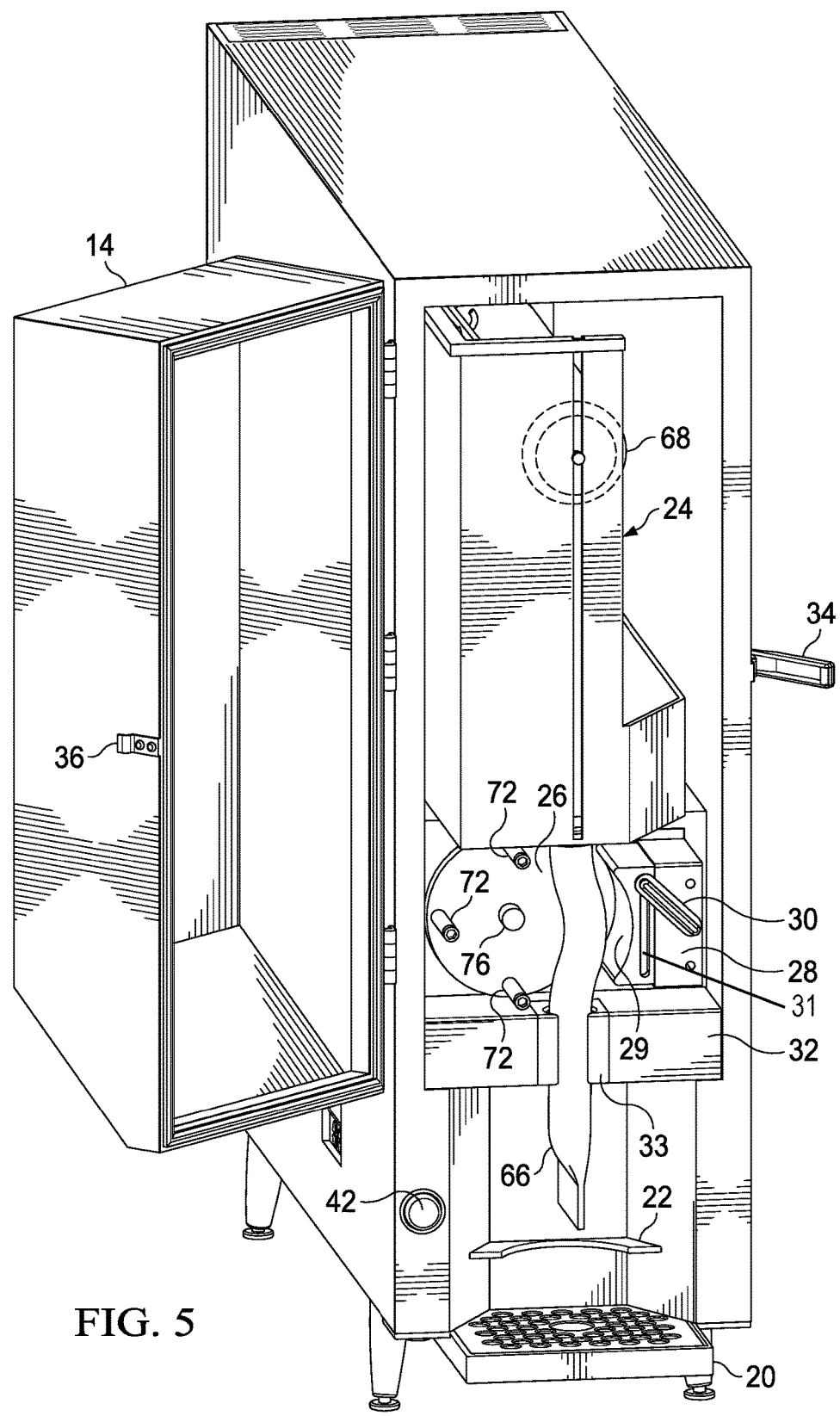
FIG. 5 is front perspective view of an embodiment depicting various components of the dispenser machine and product container inserted within the machine cabinet according to the invention disclosed herein.
Figure 6:
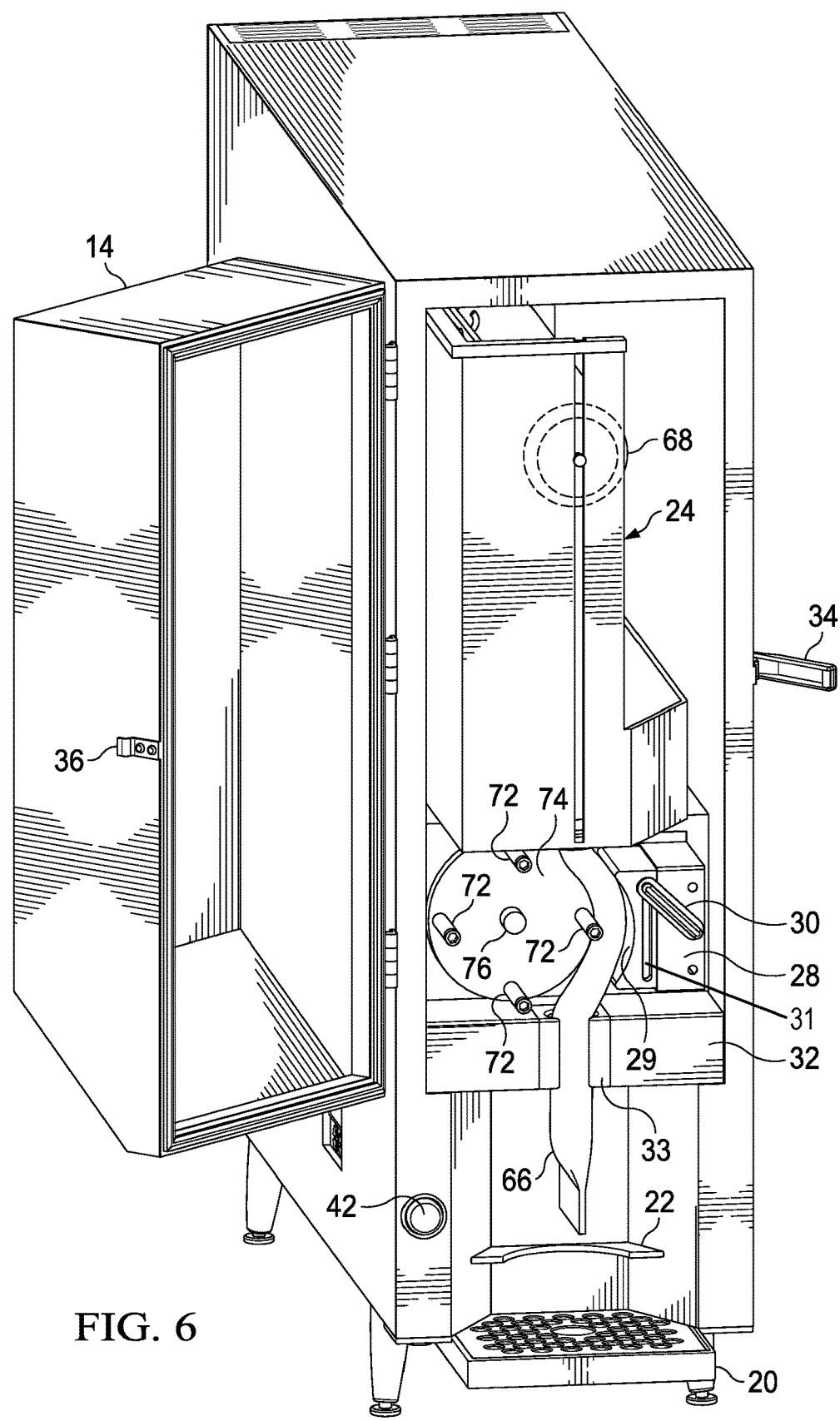
FIG. 6 is front perspective view of an embodiment depicting various components of the dispenser machine and product container inserted within the machine cabinet with the product tube spout engaged with the evacuation system according to the invention disclosed herein.
Figure 8:
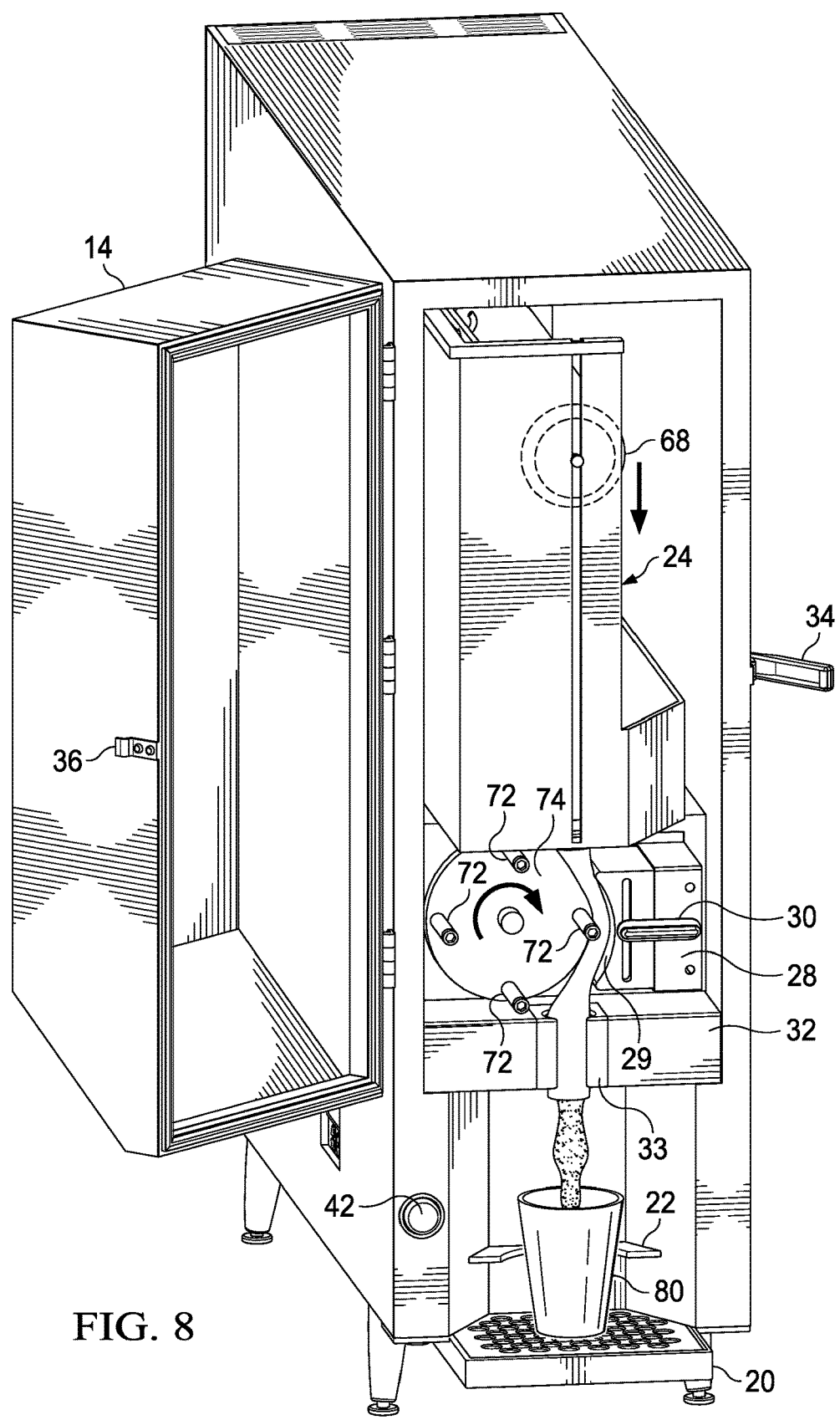
FIG. 8 is a front perspective view of an embodiment of the dispenser machine shown dispensing a viscous food or beverage product according to the invention disclosed herein.
Figure 9:
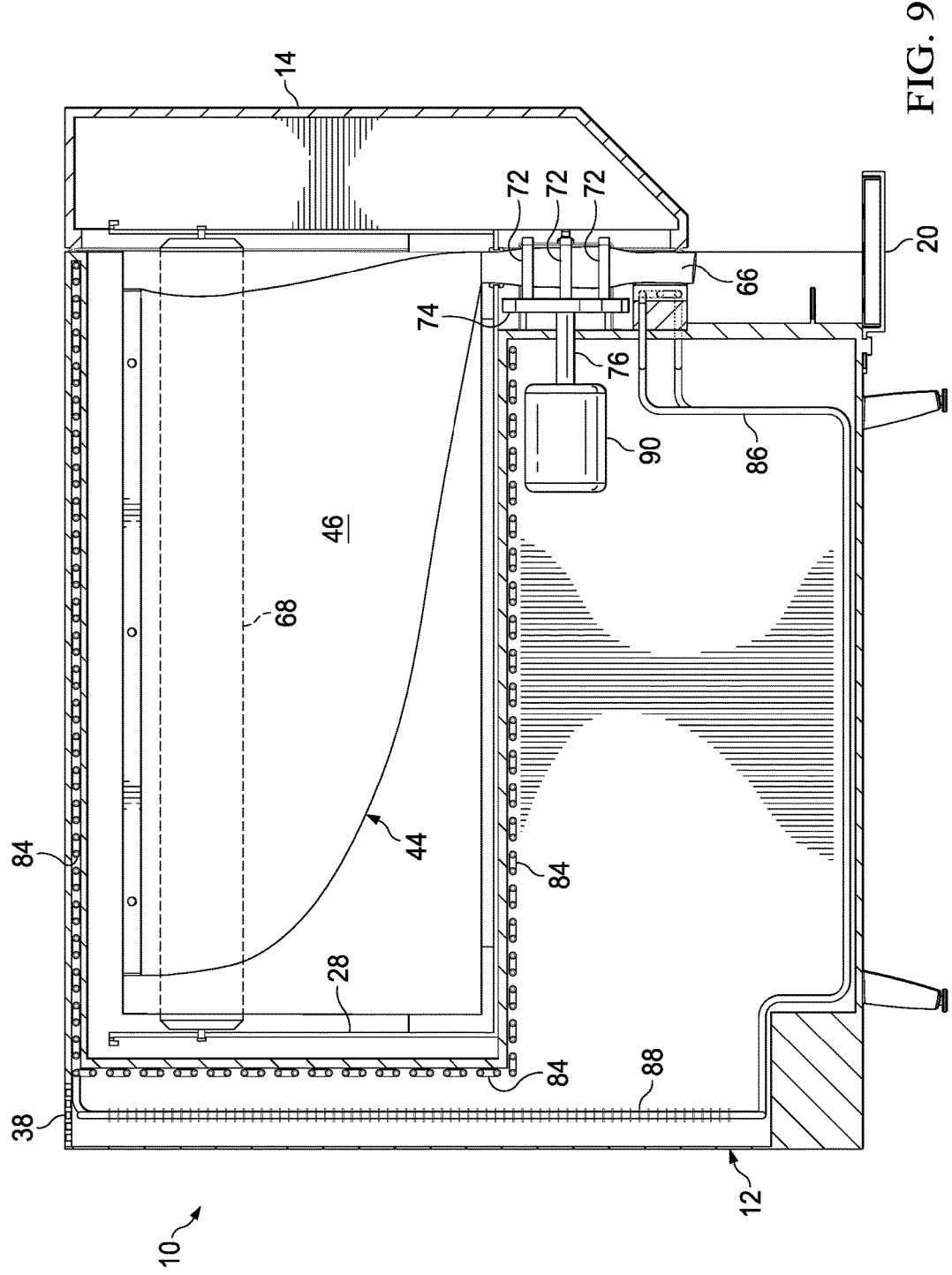
FIG. 9 is a side section view of an embodiment of the dispenser machine depicting the thermal heating and cooling system elements and pump motor and system according to the invention disclosed herein.

Container tray 24 is positioned within the interior of cabinet 12 and, in the depicted embodiment, is slidably inserted into cabinet 12 allowing for container tray 24 to be pulled out for access to, and the attachment or removal of a product container 44 such as a flexible bag, from the container tray 24 as will be described in further detail hereinafter. A pump unit, in the depicted embodiment utilizing a peristaltic mechanism, comprises a pump disc 26 with one or more pump pins 72 (as shown in FIG. 5), a drive rod 76 attached to pump disc 26 and in mechanical communication with a pump motor 90, provides for the dispensation of product from the product container 44 via tube spout 66 (as shown in FIGS. 8 and 9). A pinch deck 28 and thermal deck 32 are secured to cabinet 12 and reside within the interior of cabinet 12 when door 14 is in the closed position and assist in the dispensation of product 46 from the 10 as will be discussed in more detail hereafter. Thermal deck 32 which is in communication with thermal circuit(s) provides adjustable temperature control (e.g. heating or cooling energy) to food or beverage product 46 temporarily residing in tube spout 66 between product dispensations which minimizes, if not inhibits, the potential for bacterial growth or other unsanitary conditions to develop between product dispensations as shown in FIGS. 3 and 6. As such, there is no need to push or reverse pump the product residing within tube spout 66 back into product container 44 during periods between product dispensations or to otherwise remove product 46 in tube spout 66 to meet sanitary food requirements and regulations. Thermal deck tube guide 33 provides additional thermal insulation about tube spout 66 and aids in maintaining the temperature of product 46 temporarily retained in tube spout 66 between dispensation operations at the desired temperature to meet health and food safety requirements as shown in FIG. 6.

As depicted in FIGS. 1 and 2, a latch 34 mates with latch hook 36 to provide a mechanism for retaining door 14 in a closed position with cabinet 12. Vent 38 is located on an exterior surface of the cabinet to allow for the flow of air through a portion of the interior space of cabinet 12 to provide air flow and promote heat exchange for the thermal cooling and/or heating circuit(s) shown in FIG. 9 and which will be discussed in greater detail hereafter. A control panel 40 located on an exterior surface of cabinet 12 allows the user to control and adjust the temperature in the interior space of cabinet 12, as well as the temperature of the thermal deck 32, to enable the safe storage of a soft product and/or beverage product residing within cabinet 12 and within tube spout 66. Control panel 40 may also be configured to control operation of the pump unit and provide selectable dispensation flow rates, cycles or product volumes as desired by the user. Control panel 40 may include a programmed processor and/or other data processing device along with suitable software or other operating instructions, one or more memories (including non-transient storage media that may store software and/or other operating instructions), temperature and product level sensors, pressure sensors, input/output interfaces, communication buses or other links, a display, switches, relays, or other components necessary to perform desired input/output or other functions for purposes of operating machine 10. A dispense pushbutton 42 is located on an exterior surface of cabinet 12 and when depressed activates the dispenser 10 allowing for the dispensation of a soft food or beverage product as desired by the user and when release stopping dispensation operations.

Figure 4:
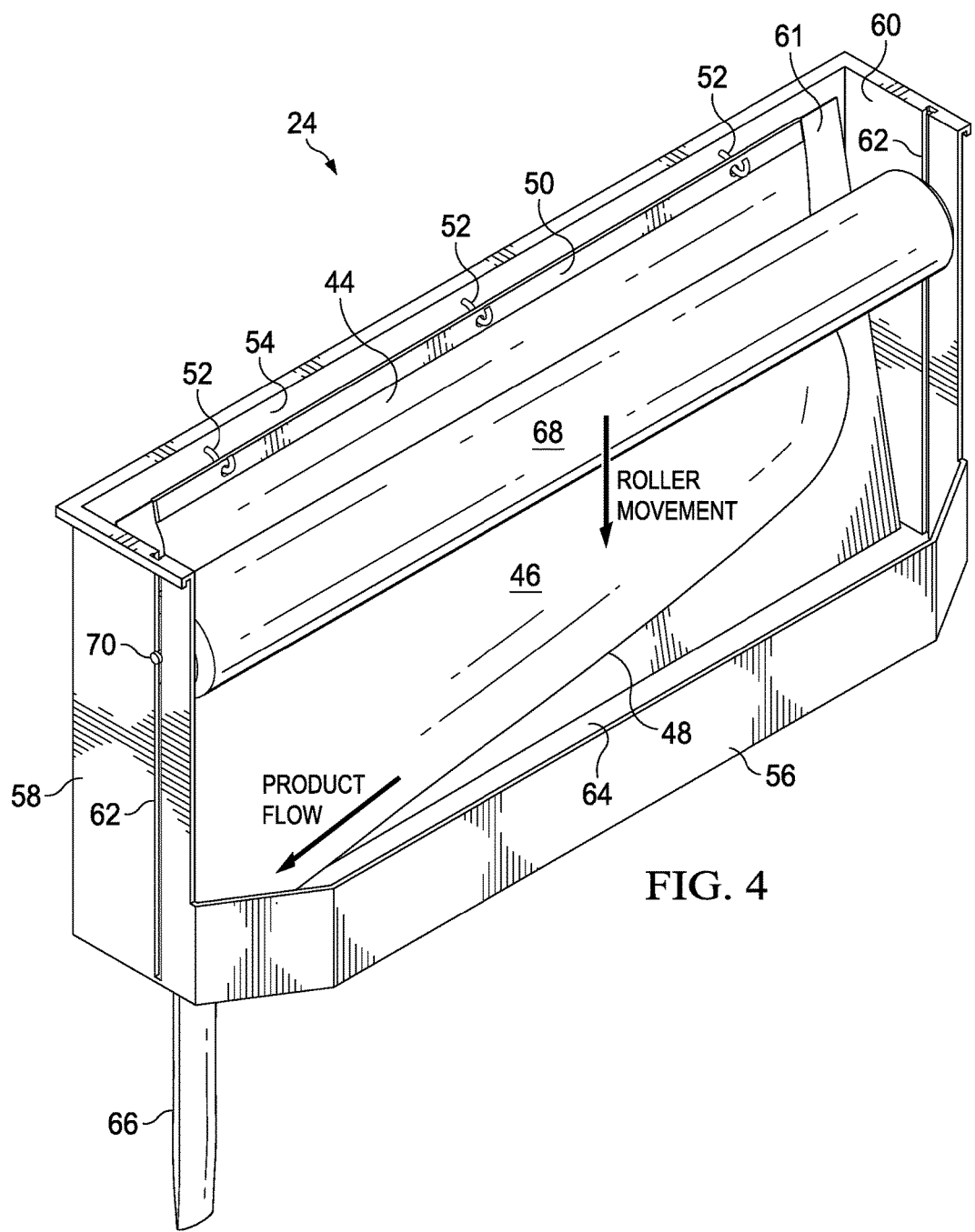
FIG. 4 is a perspective view of an embodiment of the product tray with a roller component of the evacuation system in contact with the product container supported in the product tray according to the invention disclosed herein.

FIGS. 3 and 4 are depictions of container tray 24 to which product container 44 is attached. Container tray 24 provides support for product container 44 containing soft food or beverage product 46 that is to be dispensed by dispenser 10. In the depicted embodiment, product container 44 comprises a flexible plastic container and includes a flexible tube spout 66 through which food or beverage product 46 contained in product container 44 exits during operation of dispenser 10. Tube spout 66 may be attached to product container 44 prior to use and then detached after product container 44 is emptied or tube spout 66 may be formed and manufactured as part of product container 44. Product container 44 may come in different sizes and volumes, such as a 1, 2 or 3 gallon size. It is contemplated that machine 10 may be scaled in appropriate dimension to receive product containers of various sizes and volumes and the size of the product container is not to be construed as a limitation to the inventive apparatus and methods disclosed herein. Product container 44 provides an additional advantage to the art in that the food/beverage product 46 is kept isolated in the product container 44 and food/beverage product 46 does not come into contact with any components of machine 10 during operation. Likewise, product container 44 may be constructed from biodegradable materials or designed for easy disposal or to be recyclable. As a result, the maintenance and cleaning associated with machine 10 is greatly reduced, while improving and maintaining required sanitary conditions surrounding the operation and usage of machine 10 and the product safely contained in the product container 44.

In an embodiment, product container 44 includes a rigid or semi-rigid spine 50 running a substantial portion of the length of one side of product container 44 that provides support for container 44 to be secured or suspended in cabinet 12. Product container 44 may be manufactured from a variety of plastics, polymers, films metals or other materials which are capable of safely storing a food or beverage product even with the application of moderate pressure or force applied to one or more of the exterior surface(s) of product container 44 during operation of dispenser 10 as will be discussed hereinafter. Product container 44 may be designed to be generally rectangular in shape or may include an angled or sloped portion 48 generally opposite spine 50 wherein the angled or sloped 48 portion provides a sloped incline for assisting in directing the flow of soft food product or beverage 46 towards the tube spout 66 as shown in FIG. 4. Product container 44 is also partially supported by first sidewall 54 attached to and extending perpendicular to base 64 of container tray 24. Second sidewall 56, front endwall 58, and rear endwall 60 are attached to base 64 as depicted. First sidewall 54, front endwall 58, and rear endwall 60 extend vertically and are generally perpendicular to base 64.

First sidewall 54, front endwall 58, and rear endwall 60 are generally the same height and may be formed as a one piece construction from metals or plastic materials suitable for food and beverage dispensation operations as known in the art as shown or may be separate panels which are connected together by methods and means known in the art such as by weld, rivet or threaded screws and bolts. Second sidewall 56 does not extend the same height as the other walls of tray 24. Second sidewall may be level with base 64, or extend in the range of up to an inch above the base 64, and acts as a barrier to direct any product that may leak from product container 46 along the surface of base 64 to surface for product container 44 to rest upon from slipping or sliding off of base 64. In the depicted embodiment, guide slots 62 are cut or formed in front endwall 58 and rear endwall 60 and extend for a substantial vertical length of said endwalls 58, 56 and through the tops of endwalls 58, 60 allowing for the insertion and removal of roller 68 from the container tray 24. A tube spout orifice 78 (see FIG. 18) is formed in base 64 of sufficient diameter to allow passage of tube spout 66 through tube spout orifice 78 opening when product container 44 is attached to container tray 24. Hooks 52 are attached to and spaced at intervals along first sidewall 54 for receiving corresponding holes formed along spine 50 of product container 44 and which act to support and maintain product container 44 in a fixed position to container tray 24. In other contemplated embodiments, additional and/or alternative attachment mechanisms such as tabs, snaps, hook and loop material, threaded fasteners and/or pins/studs for attaching product container 44 to container tray 24 as are known in the art may be utilized to perform a similar function to secure product container 44 to container tray 24.

In the depicted embodiment, incline wall 61 is formed or attached to first sidewall 54 and the opposing edge of incline wall 61 attached to base 64. Incline wall 61 provides an inclined surface against which one side of product container 44 rests while roller 68 travels in substantially a vertical direction and presses against the opposing side of product container 44. In this arrangement, the inclined geometry of incline wall 61 and roller 68 operate to impart a pressure force and direct the soft food or beverage product 46 in container 44 downward and towards the tube spout 66 during operation of the dispenser 10.

Prior to initiating the dispensation operation, a user sets a filled product container 44 (as depicted by product fill level shown at 48) on base 64 and suspends product container 44 that includes spine 50 with hooks 52 which are inserted through corresponding holes in spine 50. Roller 68 is placed on an opposing side of container 44 by inserting roller pins 70 on each end of roller 68 into the corresponding guide slots 62 located on front endwall 58 and rear endwall 60. Roller 68 descends by rolling under force of gravity along the exterior surface of container and forces the soft food product or beverage 46 towards the tube spout 66 until product 46 is under sufficient pressure to resist any further vertical movement of roller 68 until another volume of product is dispensed. It is contemplated that roller 68 may be constructed of various materials and weights for specific applications related to the viscosity and density of the food or beverage product being dispensed by machine 10. For example, thicker more viscous soft food products may require the use of a heavier roller 68 for urging the food product towards the tube spout 66, whereas soft liquid foods or liquid beverages may only need a lighter weight roller 68 to accomplish the purpose as would be recognized by those of ordinary skill in the art.

FIGS. 5-8 illustrate the process and mechanisms by which soft food or beverage product 46 is stored and dispensed by machine 10 as desired. Turning to FIG. 5 and now that the product container 44 has been placed on and secured to the product tray 24 as shown in FIG. 4, container tray 24 is moved inside the interior of cabinet 12 with roller 68 imparting sufficient pressure the product container 44. Tube spout 66 is threaded generally between one or more pump pins 72 and the pinch deck 28 and into and through the thermal deck tube guide 33 by the user as shown. Thermal deck tube guide 33 may comprise a metal, plastic, polymer or other rigid or semi-rigid material which is capable of conducting thermal energy imparted from thermal deck 32 through thermal deck tube guide 33 to cool or heat product 46 moving or suspended in tube spout 66 and is easily washed or cleaned to maintain a sanitary environment. Thermal deck tube guide 33 is detachably secured to thermal deck 32 and different thermal deck tube guides 33 of varying diameters may be utilized with thermal deck 32 as may be required by different tube spout diameters associated with different product containers 44 made by various product container manufacturers. In one embodiment, a peristaltic type pump is utilized for dispensation of product 46 from product container 44. In brief background, peristaltic pumps are a well-known form of positive displacement fluid pump capable of transferring a variety of fluids with various viscosities. Generally, the fluid to be transferred is contained within a flexible tube and one or more rollers or pins are attached along the external circumference of a pump rotor or disc and positioned to compress or "pinch" the flexible tube containing the liquid to be pumped. As the pump disc turns in a circular fashion, the portion of the tube under compression is pinched "closed" and then "opens" intermittently as the pump disc rotates which forces the fluid located in the tube to move into, through and out of the tube.

Figure 7:
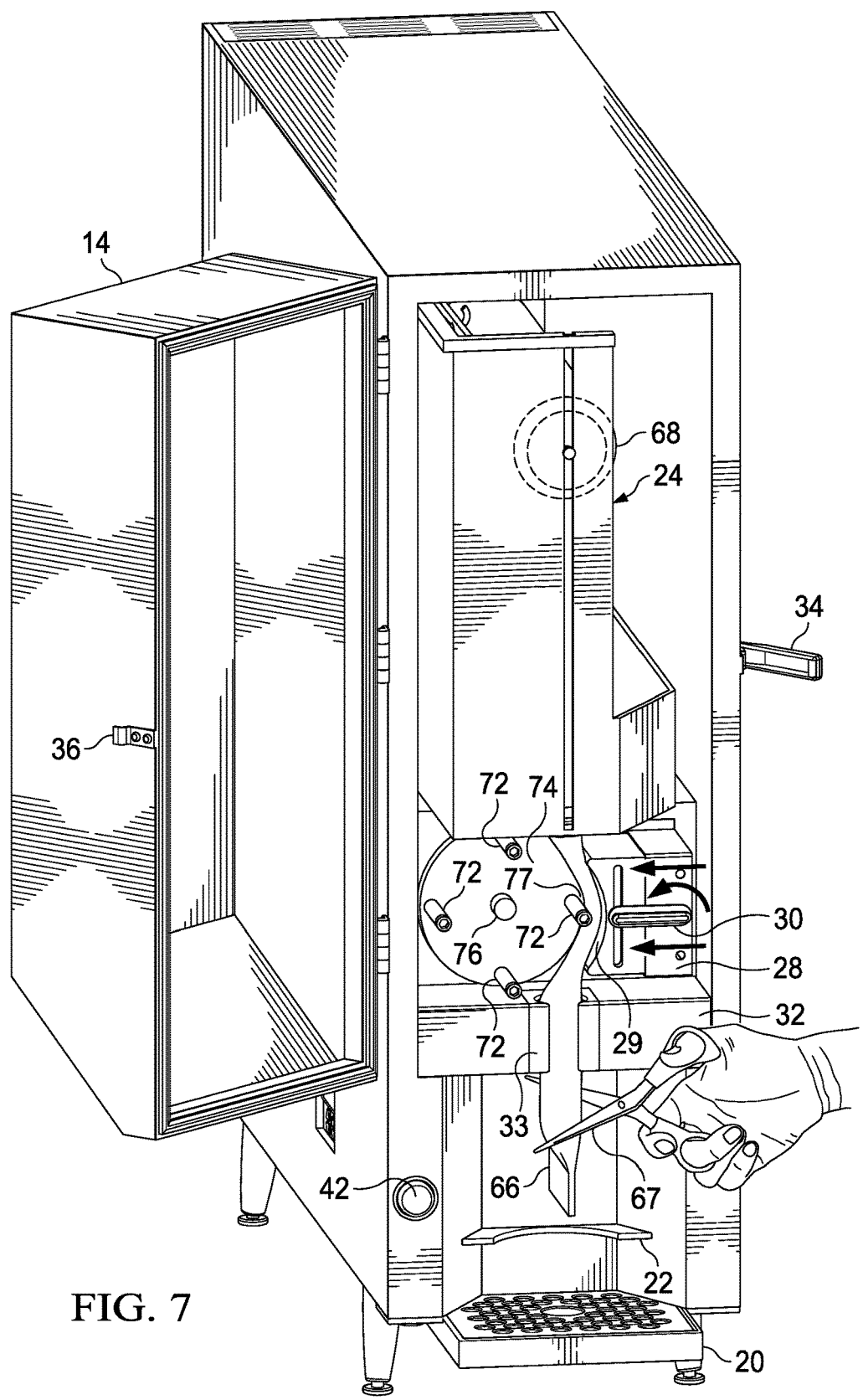
FIG. 7 is front perspective view of an embodiment depicting various components of the dispenser machine and product container inserted within the machine cabinet with the user opening the sealed product tube spout according to the invention disclosed herein.

After tube spout 66 is threaded into and through the thermal deck tube guide 33, it is positioned between one or more pump pins 72 and pinch deck 28 which includes arcuate surface 29 as shown in FIG. 6. Pinch deck 28 includes vertical slot 31, into which is secured pinch deck lever 30 via a pin (not shown) on the backside of pinch deck lever 30. The user secures a portion of tube spout 66 between one or more pump pins 72 and pinch deck 28 by depressing pinch deck lever 30 along vertical slot 31, thereby functioning to move and lock the position of the pinch deck 28 in a substantially lateral direction in closer proximity to one or more pump pins 72 whereby tube spout 66 is secured and pinched between one or more pump pins 72 at one or more pinch points between arcuate surface 29 of pinch deck 28 and one or more pump pins 72. Such arrangement prevents the flow of product 46 through the tube spout 66 while the dispenser is not in operation. To prepare for dispensation of the product 46, the user cuts the tube spout 66 with a suitable cutting tool, such as scissors 67, to unseal the tube spout 66 connected with product container 44 as shown in FIG. 7. Door 14 is then closed and secured in the closed position with latch 34 attached to latch hook 36 by the user. The user may then initiate dispensing operation by depressing dispense button 42 that actuates rotation of the pump disc 26 which results in the evacuation of product 46 from product container 44 via tube spout 66. The user may selectively alter the flow rate of product 46 dispensed by machine 10 by adjusting the rotational speed of the pump disc 26 by manipulating control panel 40 and/or by attaching or detaching the number of pump pins 72 which are attached to pump disc 26. As such, the user may easily adjust the pumping flow rate of product 46 dispensed from the product container 44 depending on various factors, including but not limited to, viscosity, density and/or type (soft food, beverage, etc.) of product 46 which is being dispensed.

FIG. 8 depicts the dispenser in operation with product 46 being dispensed into cup 80 or other suitable container for holding soft food or beverage product 46. A user places cup 80 into position on cup tray 20 with assistance from the cup guide 22 so that a portion of cup 80 may rest against cup guide 22 to insure food or beverage product 46 being dispensed flows out of tube spout 66 into cup 80 without spilling over the sides of cup 80. The user then depresses dispense button 42 which activates pump motor 90 (shown in FIG. 9) that rotates pump disc 74 via drive rod 76 with rotational force supplied by pump motor 90 to drive rod 76. As pump disc 74 rotates in the clockwise direction (when viewed from the front perspective of the machine 10), pump pins 72 repetitively press or pinch various sections of tube spout 66 positioned between pump pins 72 and arcuate surface 29 of pinch deck 28 causing substantially equal volumes of the product 46 to be drawn from the product container into the tube spout 66 and through and out of the open end of tube spout 66 and into cup 80 by the peristaltic process described herein. As product 46 is drawn from product container 44, roller 68 moves downward as product 46 exits product container 44 via tube spout 66 and roller 68 urges the remaining product 46 in product container 44 towards tube spout 66 attached to product container 44. After the desired volume of product 46 is dispensed, the user releases the dispense button 42 and pump disc 74 ceases to rotate resulting in one or more pump pins 72 substantially pinching a portion of tube spout 66 between one or more pump pins 72 and pinch deck 28 so as to substantially restrict, if not completely restrict, the flow of product 46 from tube spout 66. Additionally, any product 46 remaining in tube spout 66 which is below the lowermost contact point between a pump pin 72 and arcuate surface 29 of pinch deck 28 will exit the tube spout 66 under gravity flow conditions thereby substantially preventing the potential for bacteria to foster or grow in the tube spout 66 portion open to the atmosphere below the tube lock 28. As the corresponding portion of tube spout 66 which is in contact with arcuate surface 29 of pinch deck 28 and pump pin(s) 72 attached to pump disc 74 are enclosed in the temperature controlled interior of cabinet 12, the food or beverage product 46 residing in a corresponding portion of tube spout 66 remains at the desired or required temperature pursuant to food safety laws and requirements. As a result, the hazards and contamination issues associated with reversing the flow of food or beverage product residing between the pump pins in the flexible tube spout by reverse pumping it back into the product container as disclosed in other known dispensation equipment is overcome by this aspect of the invention disclosed herein.

After product container 44 is substantially emptied, the user simply opens access door 14 by releasing latch 34, flips or otherwise releases pinch deck lock lever 30, and removes tube spout 66 from thermal deck tube guide 33. The user then pulls product tray 24 substantially out of the cabinet 12, lifts roller 68 out of the guide slots 62 in product tray 24, unhooks and removes the substantially empty product container 44, then replaces a new product container 44 containing product 46 into the product tray 24 and reinserts roller 68 into the guide slots 62 to continue dispensation operations as described herein.

FIG. 9 is a cross-sectional view of dispensing machine 10 with product container 44 containing product 46 ready for dispensation. In the depicted embodiment, thermal circuit 84 is housed within cabinet 12 and provided to provide cooling to the product 46 contained in product container 44. Thermal circuit 86 is housed within cabinet 12 and in contact with thermal deck 32 to provide cooling to product 46 temporarily residing in tube spout 66. Control pad 40 (shown in FIGS. 1 and 2) is in communication with thermal circuits 84, 86 and allows the user to adjust the amount of cooling and/or heating to be provided by each thermal circuit 84, 86. In certain embodiments, thermal circuits 84, 86 are temperature circuits capable of providing different heating and/or cooling temperatures to the product container 44 and tube spout 66 as desired by the user or they may constitute an integrated heating and/or cooling circuit providing substantially the same heating or cooling energy to the product 46 residing in product container 44 and tube spout 66. Fins 88 are located in the rear of the cabinet and vent heat produced from cooling/heating operation to the atmosphere through vent 38. In this orientation, the heat generated from cooling/heating operations is vented vertically up and through vent 38. This orientation substantially prevents excess heat from being vented on to other equipment, materials and food/beverage products that may be located in proximity to machine 10 and detrimentally affect such other equipment, materials and food/beverage products located in the vicinity. An exhaust fan (not shown) may also be incorporated within the cabinet 12 to provide additional exhaust/heat dissipation functionality if desired.

Figure 10:
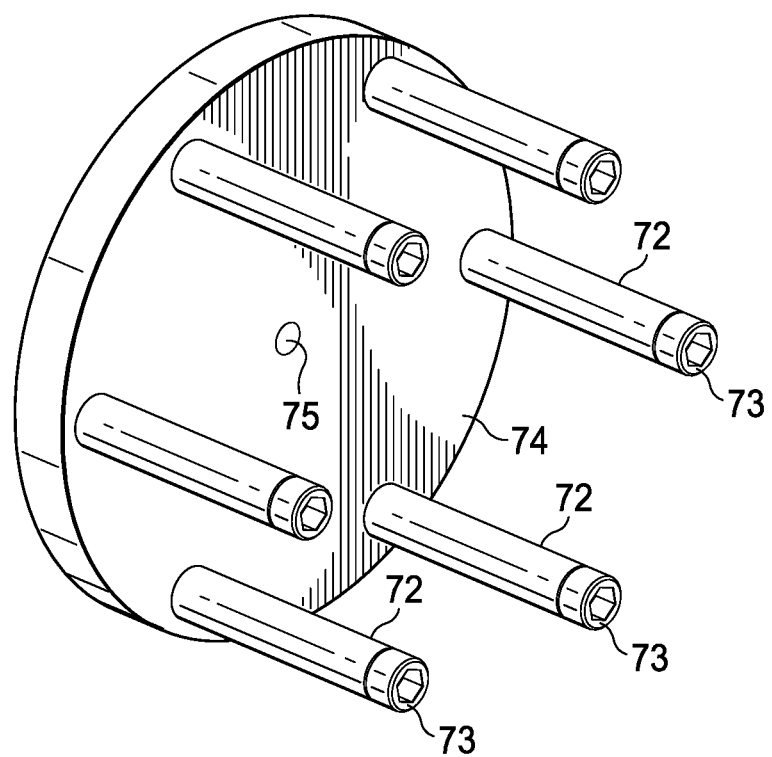
FIG. 10 is a perspective view of an embodiment of the pump wheel with configurable pump pins providing for the adjustability of the pump flow rate according to the invention disclosed herein.

FIG. 10 depicts various embodiments of pump disc 74 with pump pins 72 secured to pump disc 74 with threaded connectors 73. Threaded connectors 73 may include, but are not limited to, threaded bolts or screws sized to be inserted within or to pump pins 72 and screwed into corresponding threaded receiving holes on pump disc 74. In this way, the user may detachably install the desired number of pump pins 72 on pump disc 74 to adjust the flow rate of product 46 delivered during operation of the machine 10. An orifice 75 is provided to allow the pump disc 74 to be detachably removed from drive rod 76. Orifice 75 may be threaded to provide a threaded connection between pump disc 74 and drive rod 76 or may be configured by other connection means, such as bolts, nuts, threaded screw cap, as is known in the art to allow the user to detachably secure pump disc 74 to drive rod 76.

Figure 11:
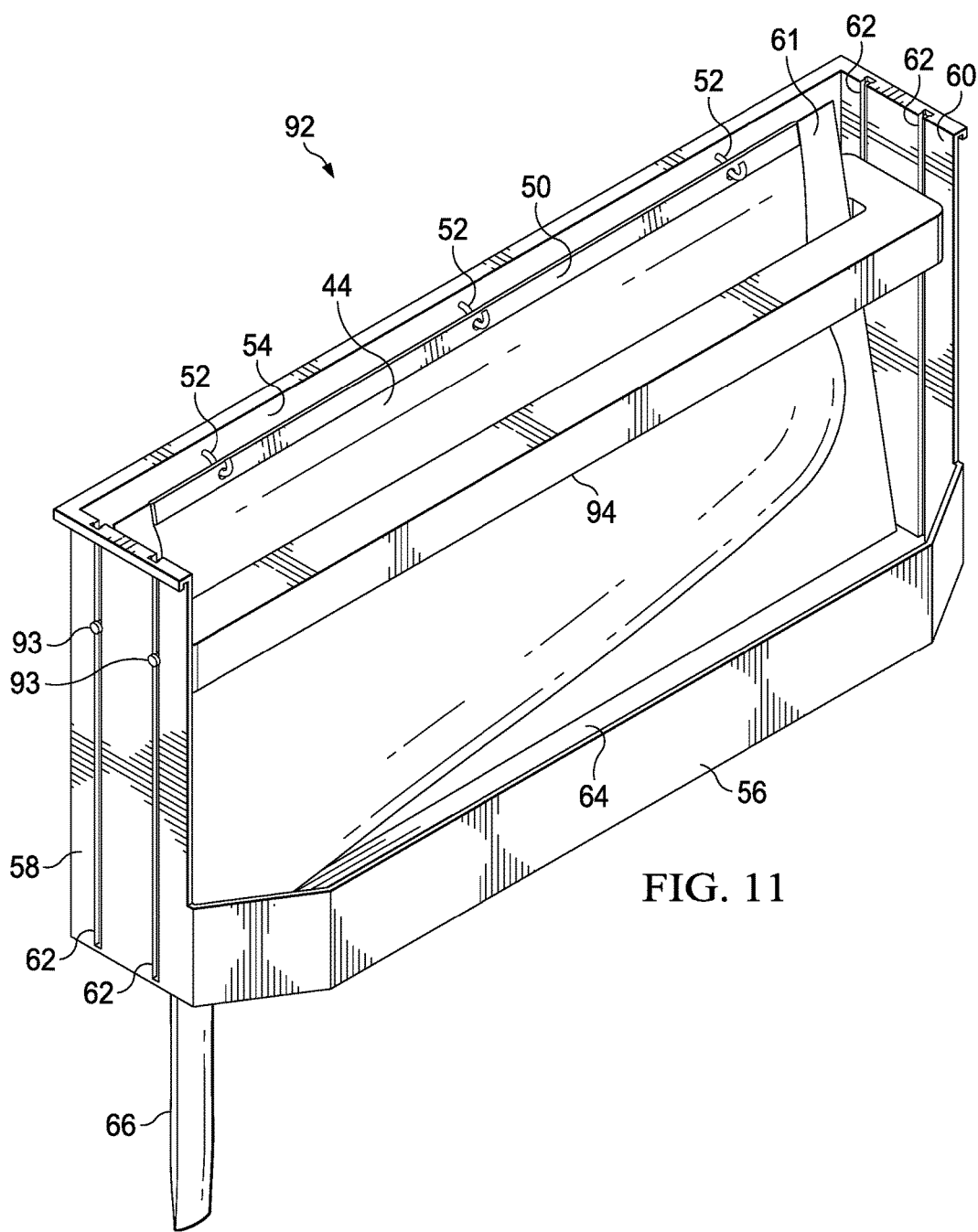
FIG. 11 is a perspective view of an embodiment of the product tray with a squeegee component of the evacuation system in contact with the product container supported in the product tray according to the invention disclosed herein.

Turning to FIG. 11, an embodiment of the invention disclosed herein is shown depicting a squeegee 94 evacuation component which surrounds product container 44 and acts to impart a compressive downward force on at least two sides of product container 44 which provides a pressure force on to product 46 residing in product container 44 to urge product 46 in product container 44 towards tube spout 66. In the depicted embodiment, guide slots 62 are cut or formed in front endwall 58 and rear endwall 60 and extend for a substantial length of said endwalls 58, 60 and up through the top of endwalls 58, 60 enabling insertion of roller pins 93 that are attached to squeegee 94. Spine 50 of product container 44 is inserted between opposing sides of squeegee 94 and then attached to first sidewall 54 via hooks 52. Squeegee 94 is preferably formed of materials such as metal, dense polymers and/or plastics or a combination thereof, to provide sufficient weight to overcome any resistive frictional force imparted to squeegee 94 by product container 44 and squeegee 94 will easily slide and descend downward along the exterior surfaces of the product container 44 as product exits the product container 44 during dispensing operations as generally described above herein.

Figure 12:
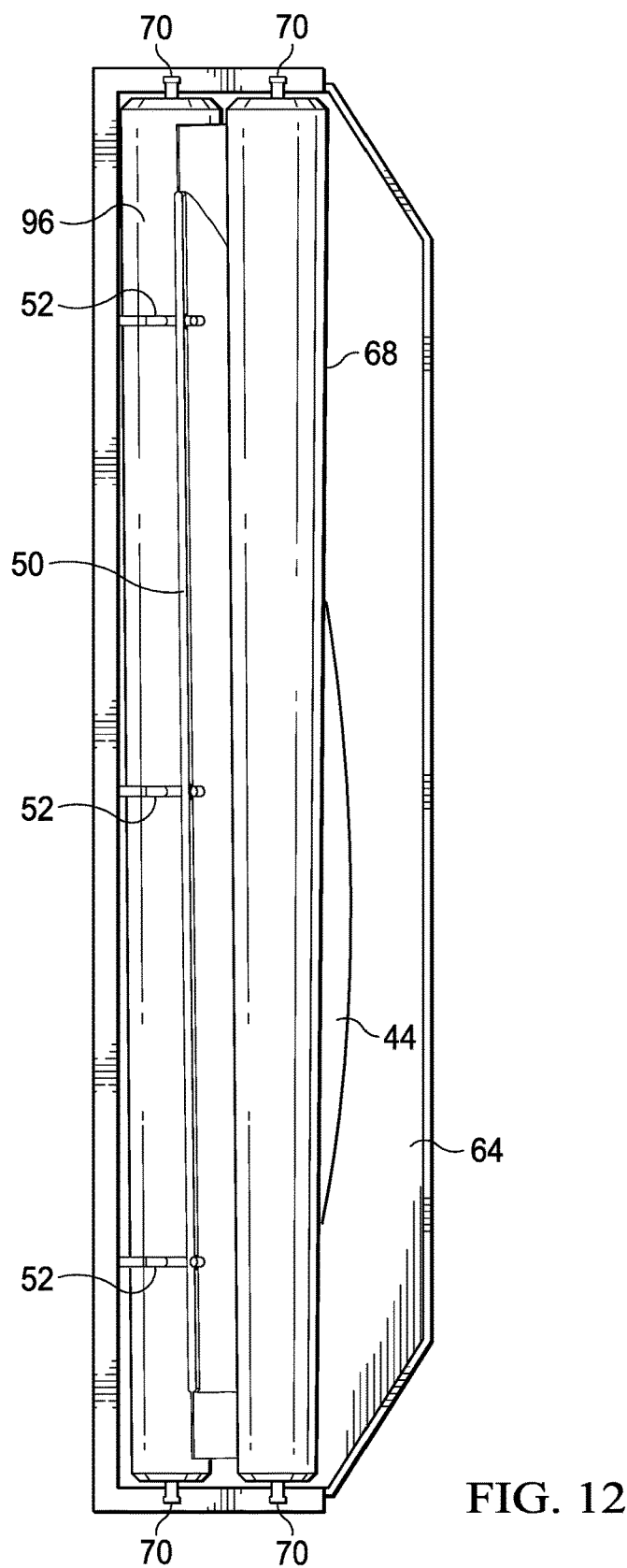
FIG. 12 is a perspective view of an embodiment of the product tray with a double roller component of the evacuation system in contact with the product container supported in the product tray according to the invention disclosed herein.

An embodiment of the invention disclosed herein is shown in FIG. 12 and depicts a dual roller evacuation configuration wherein rollers 68, 96 are placed on opposing sides of product container 44 which is suspended by hooks 52 attached to first sidewall 54 and where hooks 52 are inserted through corresponding holes formed in spine 50 of product container 44. Rollers 68, 96 rest against opposing sides of product container 44 and act to impart a pinching force on both sides of product container 44 which in turn imparts pressure on product 46 residing in product container 44 sufficient to urge product 46 residing in product container 44 towards tube spout 66 as rollers 68, 96 counter-rotate relative to each other in substantially the vertical direction as product is evacuated from product container 44 during operation of the dispenser 10. In the depicted embodiment, four guide slots 62 are cut or formed in front endwall 58 and rear endwall 60 and extend for a substantial length of said endwalls 58, 56 and through the top of endwalls 58, 60 for the receipt of roller pins 70 which are attached to rollers 68, 96. Rollers 68, 96 are preferably formed of materials such as metal, dense polymers and/or plastics, or a combination thereof, to provide sufficient weight to overcome any resistive frictional force imparted to rollers 68, 96 by product container 44 and associated resistance from product 46 in product container 44 and will roll downward along the exterior surface of the product container 44 as product 46 exits the product container 44 during dispensing operations as generally described herein.

Figure 13:
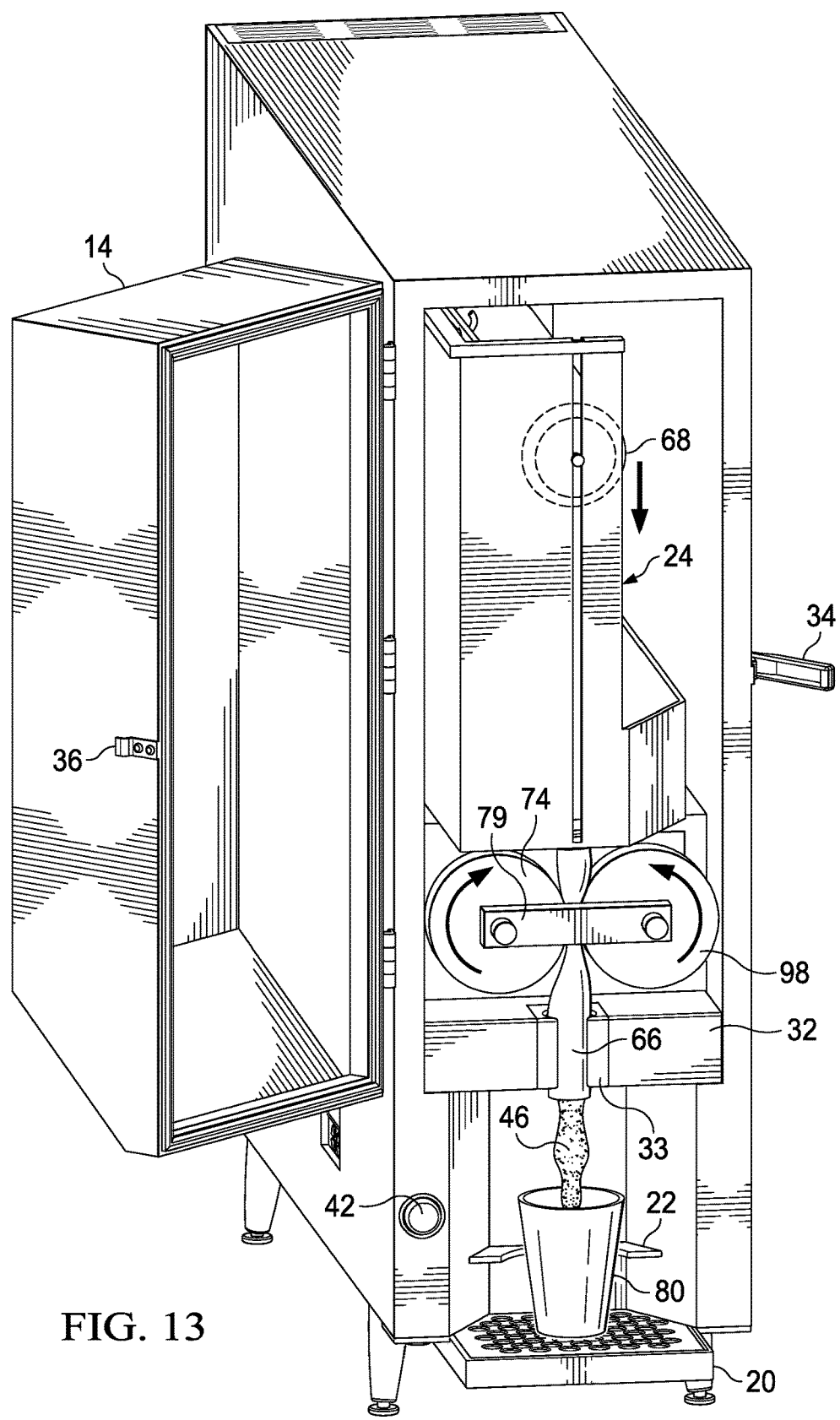
FIG. 13 is a perspective view of an embodiment of the dispenser invention including a dual pump dispensation system according to the invention disclosed herein.

An embodiment of the invention is shown in FIG. 13 and depicts a dual pump evacuation topology wherein pump discs 74, 98 are positioned in lateral proximity to each other with tube spout 66 inserted between the pins attached to pump discs 74, 75. In this configuration, pump disc 98 counter-rotates as pump disc 74 rotates in the clockwise direction depicted by the arrows in FIG. 13. Pump discs 74, 98 may be assembled in a fixed position relative to each or may be suspended and moved closer or farther away from each other in the horizontal plane to allow for insertion and removal of tube spout 66. A spring mechanism (not shown) may be utilized to impart a force sufficient to draw or bias pump discs 74, 98 towards each other until they sufficiently impart a pinching force on tube spout 66 for conducting dispensation operations. A latchbar 79 may be detachably attached and positioned by the user to fix the positions of pump discs 74, 98 relative to each other to maintain proximal bias during dispensation operations so as to substantially inhibit any horizontal movement of pump discs 74, 98 and thereby maintaining sufficient pinching force on tube spout 66 during dispensation operations. In a contemplated embodiment, tube spout 66 is pinched between discs 74, 98 which may include rollers pinch points surrounding the circumference of pump discs 74, 98 for aiding in the peristaltic evacuation of a food or beverage product 46 from product container 44.

Figure 14:
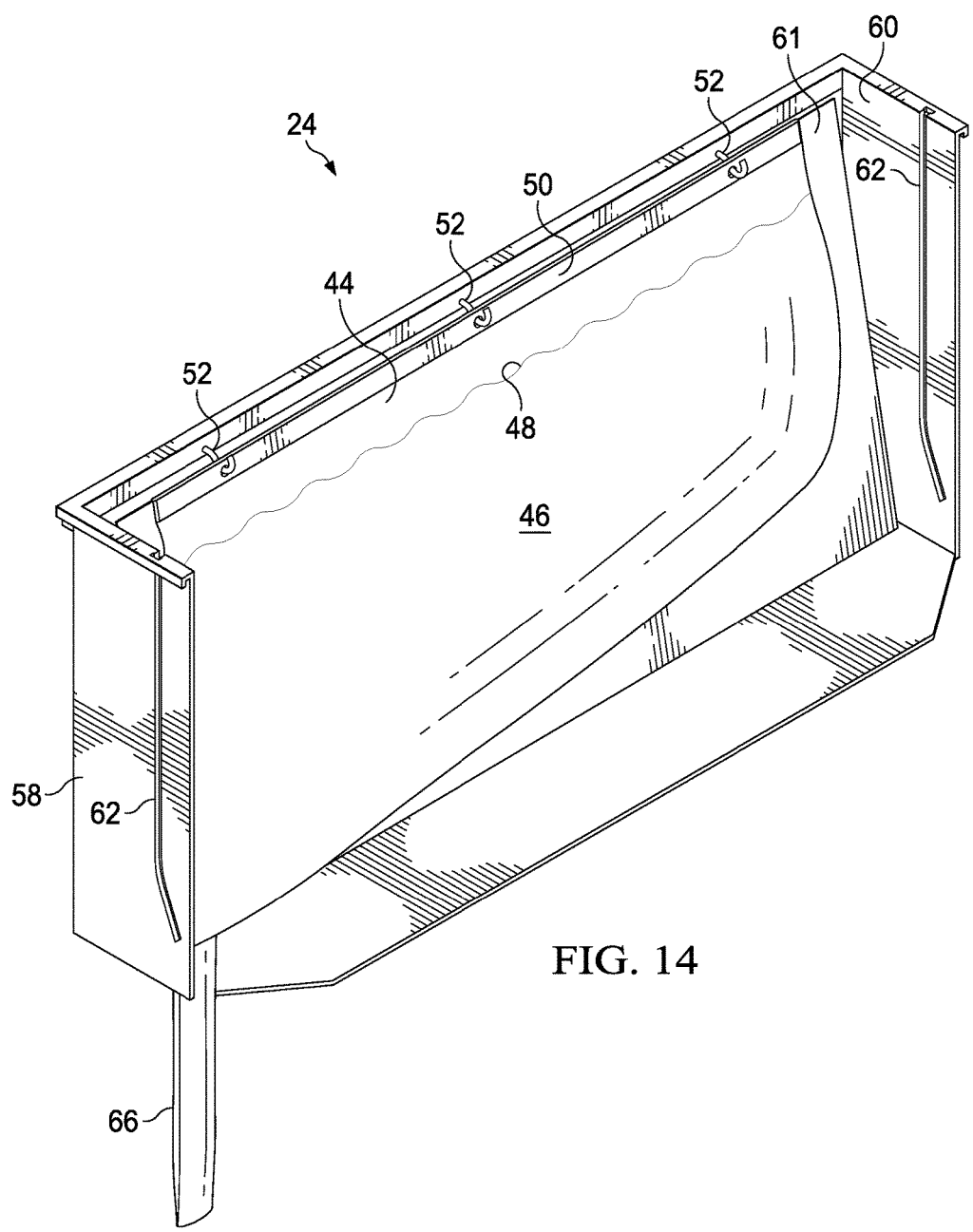
FIG. 14 is a perspective view of an embodiment of the product tray with curved roller pin guide slots according to the invention disclosed herein.
Figure 15:
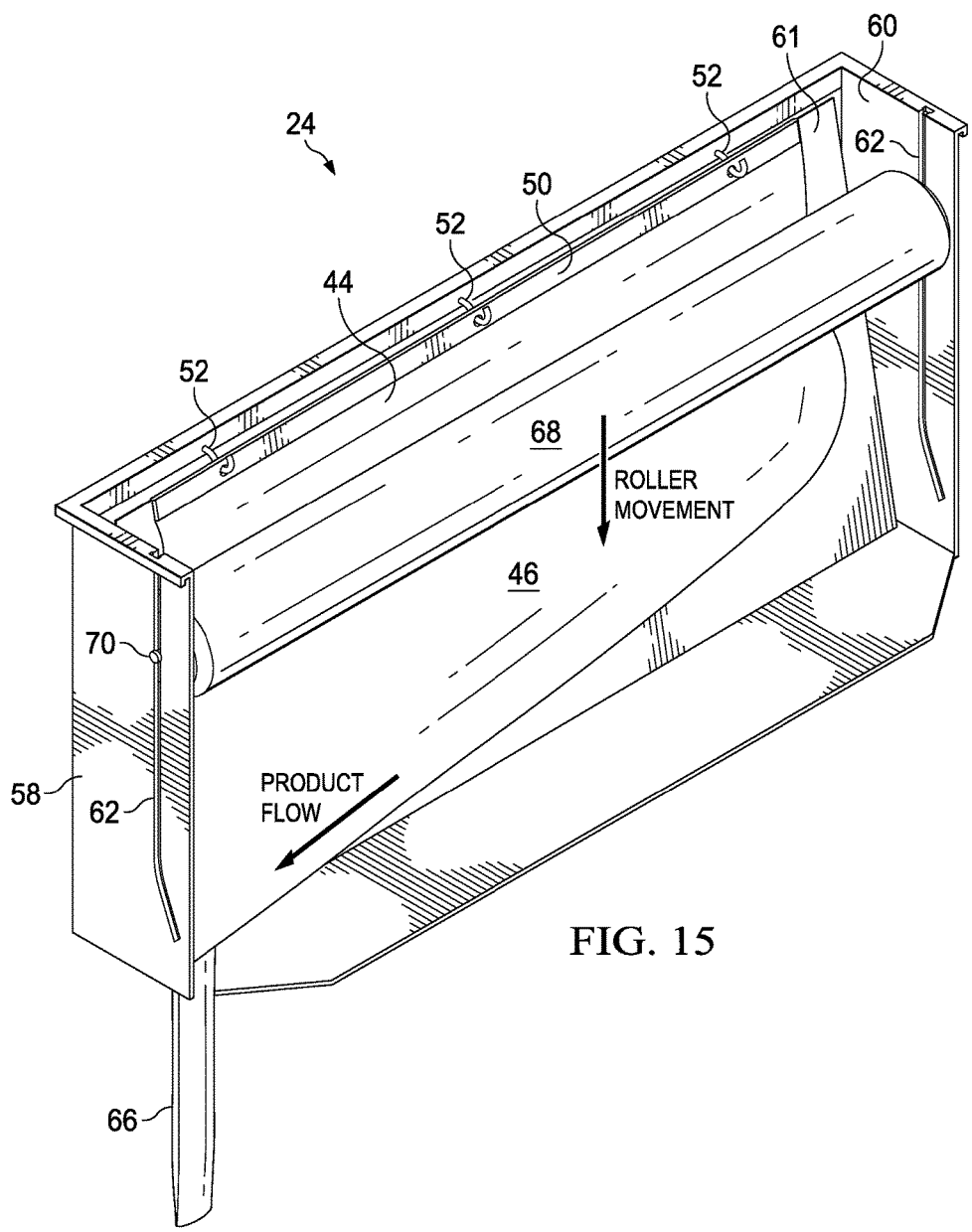
FIG. 15 is a perspective view of an embodiment of the product tray and roller with curved roller pin guide slots according to the invention disclosed herein.

Turning to FIGS. 14 and 15, an embodiment of container tray 24 is depicted with curved guide slots 62 as shown. Container tray 24 provides support for product container 44 containing a soft food or beverage product 46 that is to be dispensed by dispenser 10 as generally described above. In the depicted embodiment, product container 44 is supported by container tray 24 as shown and previously described herein. Product container 44 is also partially supported by first sidewall 54 attached to and extending substantially perpendicular to base 64 of container tray 24. Front endwall 58, and rear endwall 60 are attached to base 64 as depicted. First sidewall 54, front endwall 58, and rear endwall 60 extend vertically and generally perpendicular to base 64. In the depicted embodiment, the tube spout 66 passes beside the edge of base 64 where base 64 meets a portion of the length of the bottom edge of front endwall 58. No slot or orifice is required to allow for the tube spout 66 to pass from the product container 44 through the container tray 24 in this configuration. Guide slots 62 include a curved portion as shown. The curved portions of guide slots 62 provide a mechanism by which as product container 44 approaches being substantially emptied, roller 68 begins to move in an arcuate lateral downward direction along the curved path delineated by curved lengths of guide slots 62, while maintaining pressure on the remaining product 46 contained in product container 44. This configuration aids in the substantially complete evacuation of product 46 from product container 44 by maintaining a vertical and lateral pressure component against the product container 44 and substantially inhibiting the potential for roller 68 to come to rest on the surface of base 64 and pinching a portion of the product container 44 between roller 68 and base 64 resulting in the formation of a substantially sealed pocket with product 46 restricted from passing to tube spout 66.

Figure 16:
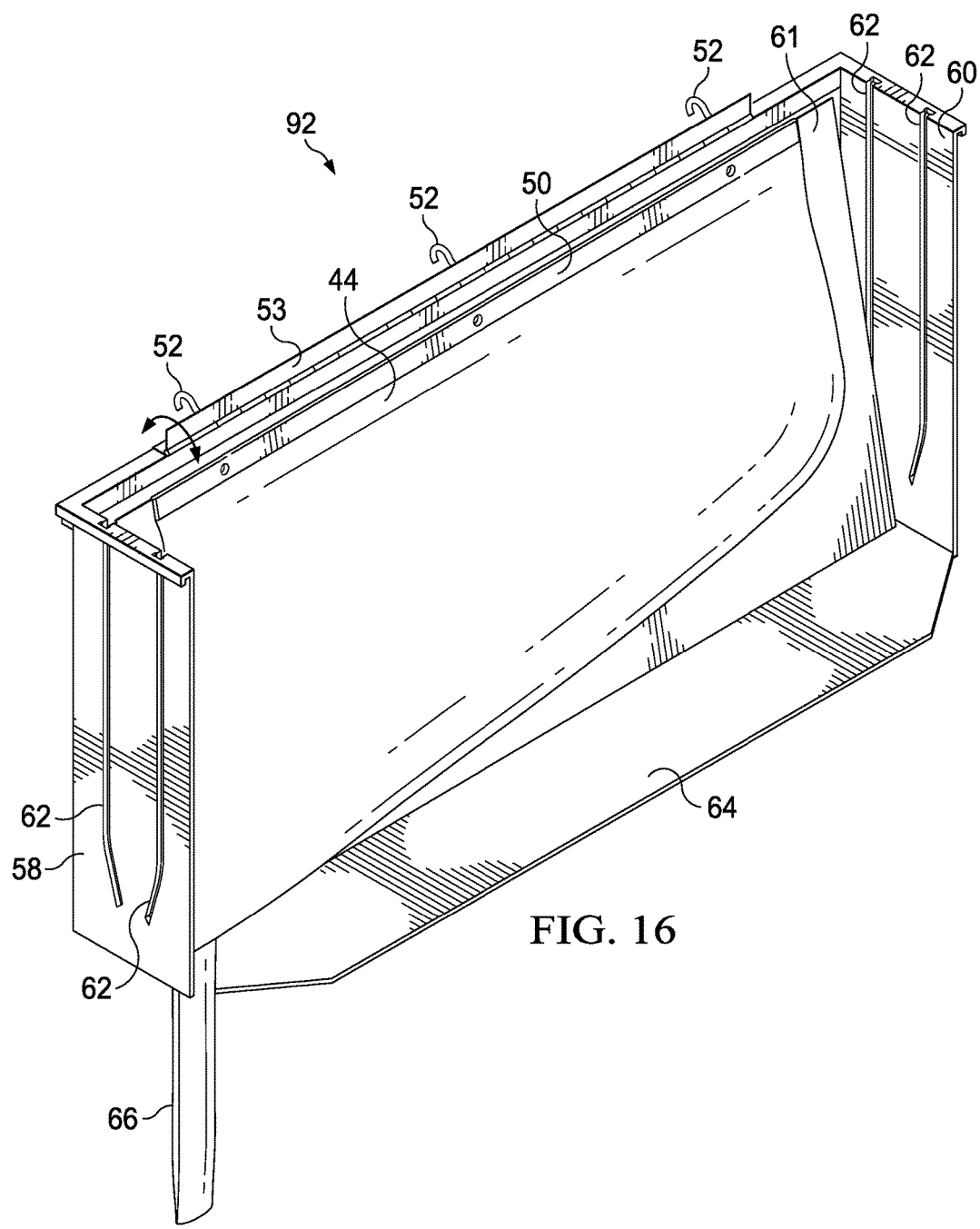
FIGS. 16 and 17 are perspective views of an embodiment of the product tray with a hinged support bar for supporting the product container and including multiple rollers according to the invention disclosed herein.
Figure 17:
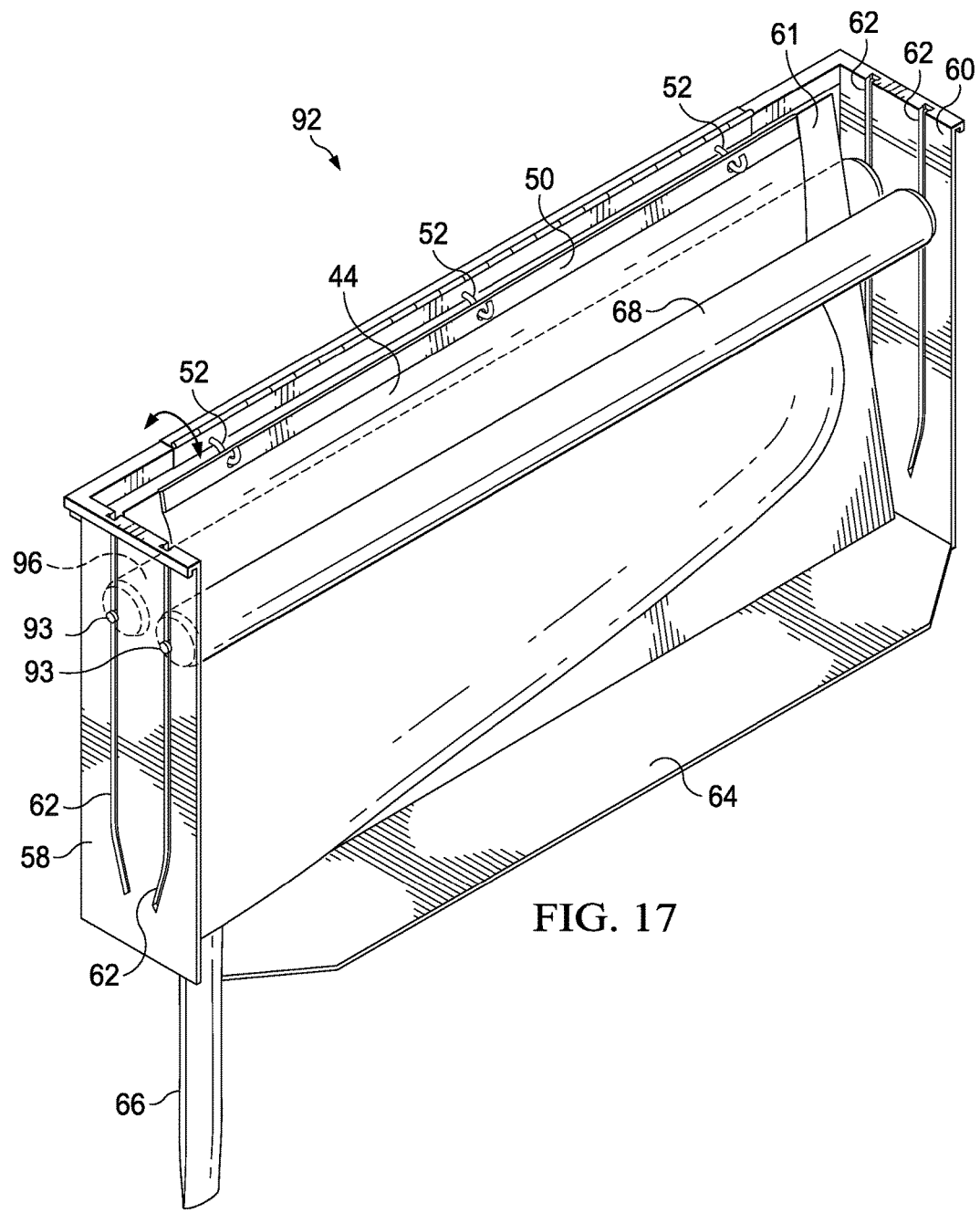

Turning to FIGS. 16 and 17, an embodiment of the container tray 24 is depicted with two rollers 68 and two pairs of curved guide slots 62 as shown. In this embodiment, product container 44 is suspended between opposing rollers 68 which provide oppositional pressure forces against opposing surfaces of product container 44 to aid in urging the food or beverage product 46 contained within product container 44 towards tube spout 66 for dispensation. In the depicted embodiment, product container 44 is suspended above base 64 of container tray 24 with a hinged support strip 53 which is connected along a top length of first sidewall 54 and the opposing hingedly connected support strip with attached hooks 52 which are inserted through holes in spine 50 of product container 44 as shown. When product container 44 needs to be removed or otherwise replaced, the user may simply remove product container 44 and fold the hinge support strip 53 towards first sidewall 54 and, if desired, remove roller 68 for cleaning or maintenance. In the depicted embodiment, the tube spout 66 passes beside the edge of base 64 where base 64 meets a portion of the length of the bottom edge of front endwall 58. No slot or orifice is required to allow for the tube spout 66 to pass from the product container 44 through the container tray 24. Two pairs of guide slots 62 include curved slot portions as shown. The curved lengths of guide slots 62 provide a mechanism by which the suspended product container 44 is substantially pinched from opposing sides by rollers 68, 96 as the product container 44 is emptied. As product container 44 approaches being substantially emptied, roller pins 93 enter the curved portions of guide slots 62 in turn bringing rollers 68, 96 in closer proximity to each other and continually maintaining pressure on the product 46 contained in product container 44. Thus, aiding in the substantially complete evacuation of product 46 from product container 44 by maintaining opposing vertical and lateral pressure components against the product container 44 until the product container 44 is substantially empty.

Figure 18:
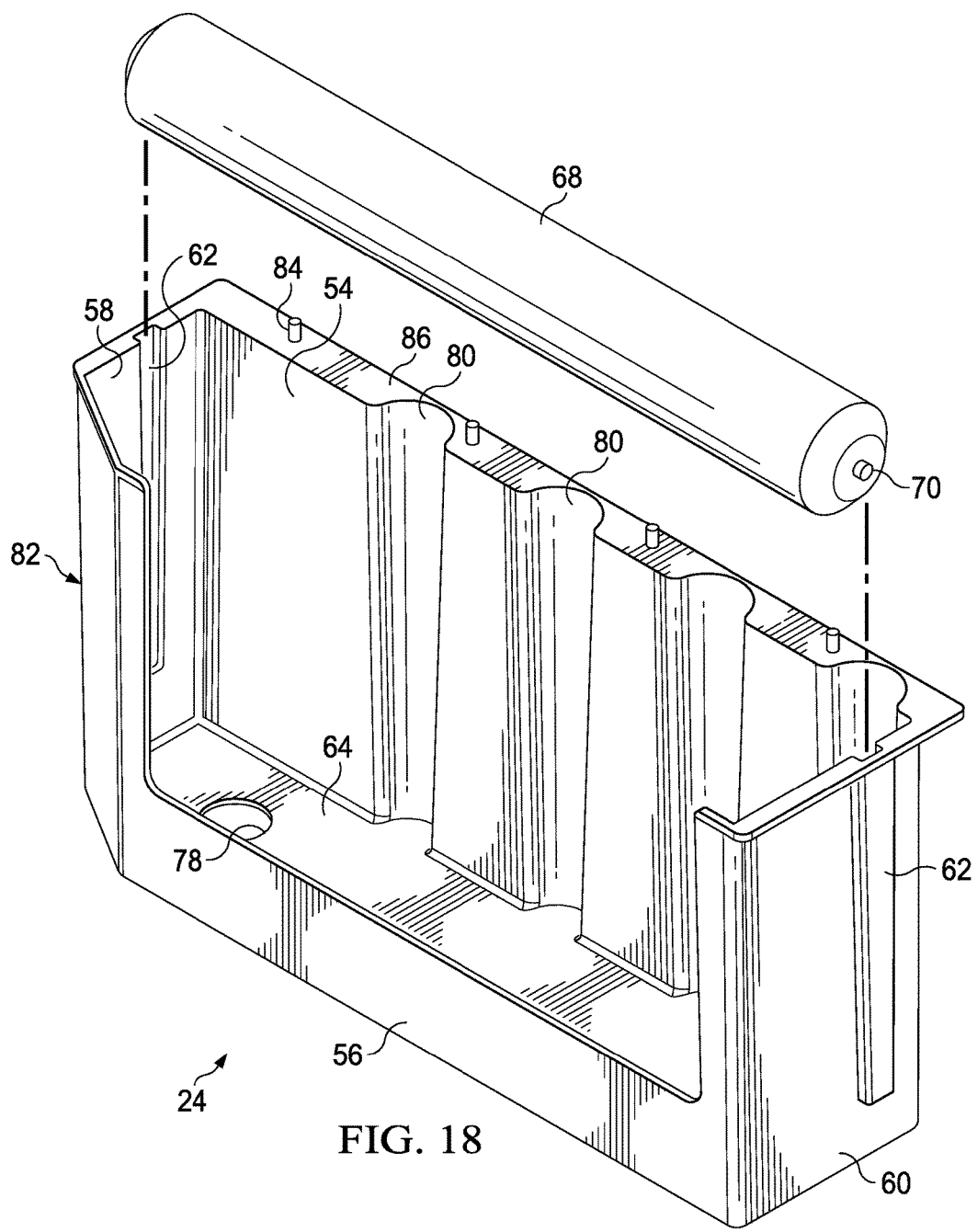
FIG. 18 is a perspective view of an embodiment of the product tray with pin connectors for supporting the product container according to the invention disclosed herein; and, FIG. 19 is a flow diagram describing an embodiment of the dispensation method according to the invention disclosed herein.

FIG. 18 discloses an embodiment of the container tray 24 with corrugations 80 formed on a first sidewall 54. In the depicted embodiment, front endwall 58, first sidewall 54, rear endwall 60, second sidewall 56 and angled third sidewall 82 are attached and may be formed as a single unit with base 64 or assembled in parts with connections means such as by welding, adhesives, rivets, screws or other connection means as known in the art. Pins/studs 84 are shown fixed to the top surface 86 of first sidewall 54 for purposes of attaching or suspending a product container as previously shown and described herein. It is contemplated that other fastening means such as rivets, snaps, hook and loop material, hooks or other attachment mechanisms for attaching a product container to container tray 24 as are known in the art may be utilized to perform a similar function to secure a product container to container tray 24 as described herein.

Corrugations 80 formed in first sidewall 54 provide enhanced structural strength and rigidity for supporting larger volume and weight product containers that are supported or suspended partially or totally by first sidewall 54. Front endwall 58 and rear endwall 62 are provided with guide slots 62 formed into the interior opposing surfaces of front endwall 58 and rear endwall 62 and are dimensioned for receipt of corresponding roller pins 70 and provide a channel for guiding the roller 68 in a descending movement as product is evacuated from a product container. An orifice 78 is formed or otherwise cut in base 64 through which a tube spout is inserted when a product container is placed in container tray as described herein.

Figure 19:
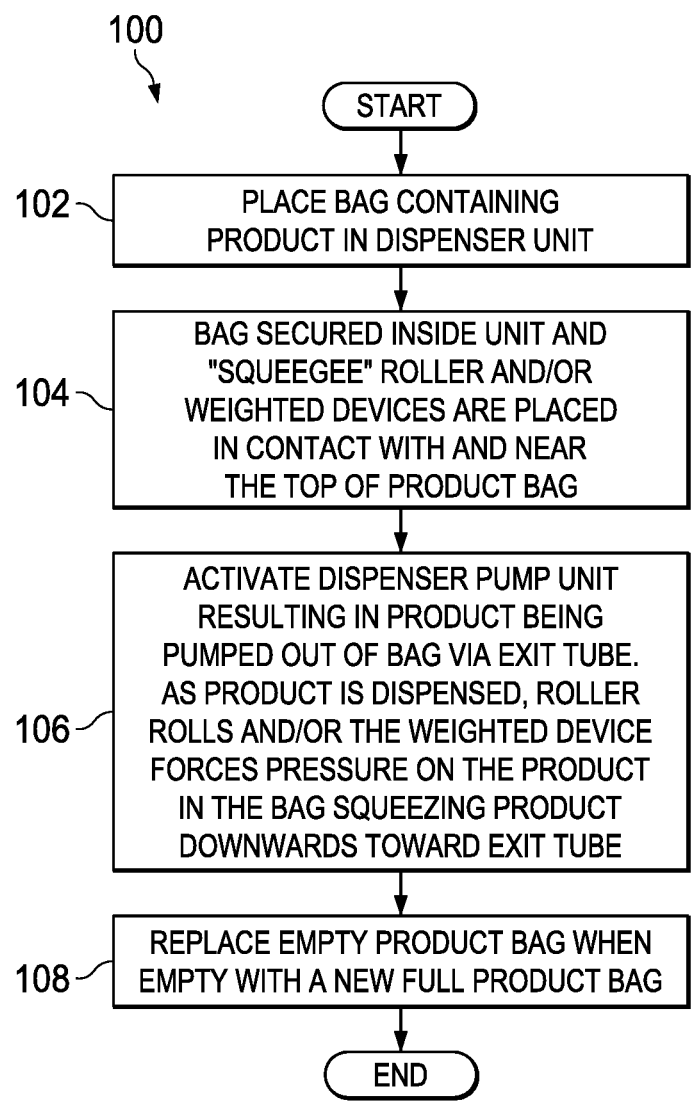

Turning to FIG. 19, a flow diagram depicting an embodiment of the dispensation process using the apparatus disclosed herein is presented. The user places a container bag containing the product to be dispensed, a soft food or beverage, inside the cabinet and which is supported and/or suspended by the container tray as described herein (Step 102). The user positions a roller or other weighted device in contact with a surface of the container bag at or near the top of the container bag being supported and/or suspended by the container tray (Step 104). The user closes the door to the dispenser unit that is plugged into a power source and activates the unit to begin dispensing the product out of the container bag via the exit tube (also referred to herein as "tube spout"). As product is dispensed out of the container bag the roller or other weighted component applies pressure to the contents of the container bag which acts to squeeze or urge the product towards the tube spout (Step 106). After the container bag is substantially emptied, the user removes the empty container bag and inserts a new container bag filled with a product to be dispensed and may re-initiate dispensation operations as described herein (Step 108.)

Figure 20:
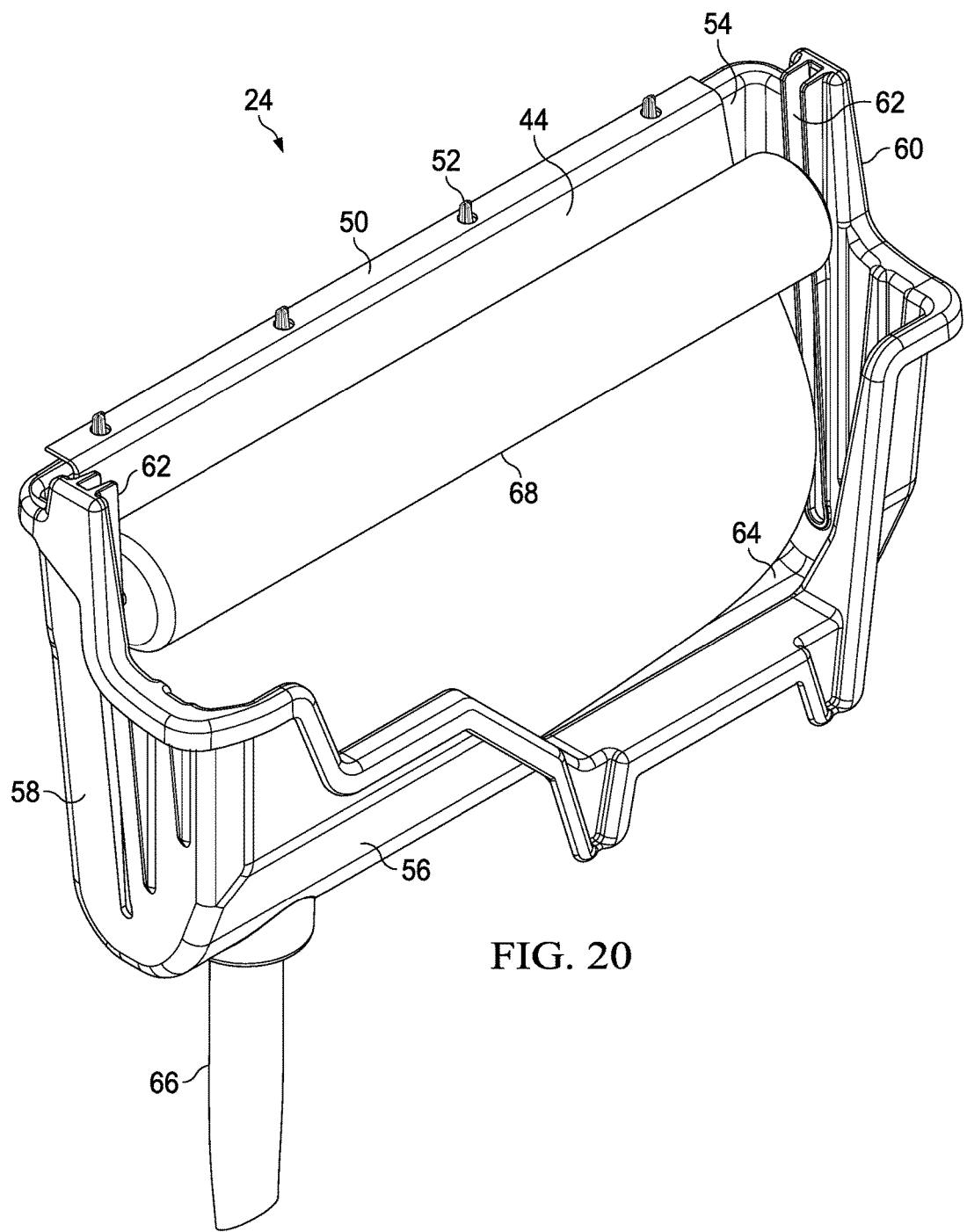
FIG. 20 is a perspective view of an embodiment of the product tray with a curved base and angled first and second sidewalls according to the invention disclosed herein.
Figure 21:
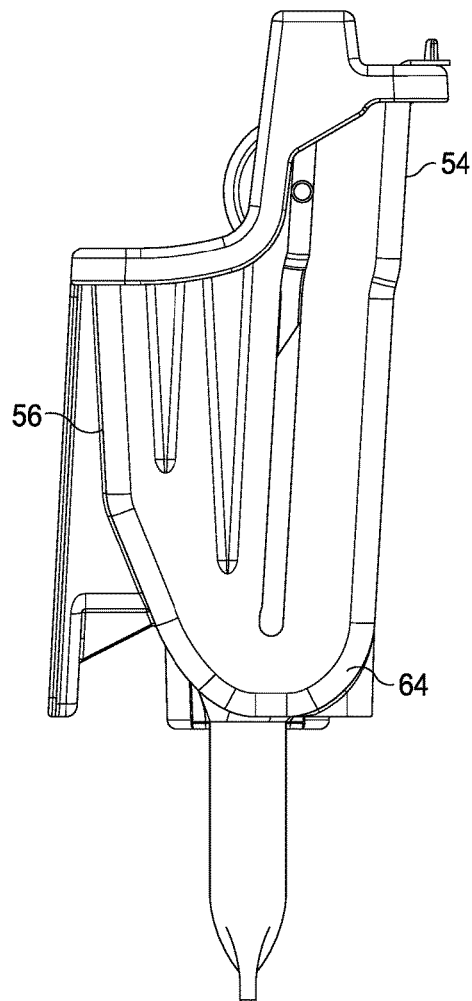
FIG. 21 is a side perspective view of an embodiment of the product tray with a curved based and angled first and second sidewalls according to the invention disclosed herein.

Referring now to FIGS. 20-21, perspective drawings of an embodiment of a rounded container tray 24 are depicted. Rounded container tray 24 is defined by a curved base 64, a first angled sidewall 54 which slopes slightly out from the curved base 64, and a second angled side wall 56 which also angles outward from the curved base 64. Front endwall 58 and rear endwall 60 are configured to attach to the ends of rounded container tray 24, as depicted. Rounded container tray 24 also includes fastening knobs 52 which enable product container 44 to be attached to the rounded container tray 24.

In operation, first angled sidewall 54 and curved base 64 provide an angled surface against which one side of product container 44 rests while roller 68 travels downward in a substantially vertical direction, pressing against the opposing side of the product container 44. The angled and rounded formation of first sidewall 54, relative to base 64, enables roller 60 to translate smoothly against product container 44, thereby effectively drawing out substantially the full volume of product 46 contained in product container 44 downward and towards the tube spout 66 during operation of the dispenser 10.

Figure 22:
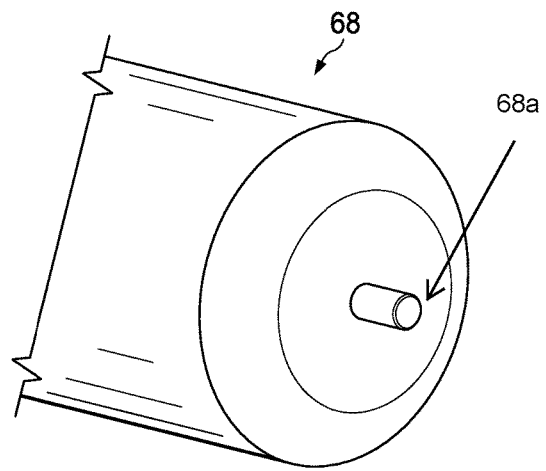
FIG. 22 is a close-up view of an embodiment of the roller having a magnetic tip according to the invention disclosed herein.

Referring now to FIG. 22, an embodiment of roller 68 is depicted, wherein a first end of the roller 68 includes roller pin having a magnetic tip 68a that assists in signaling that the product container 44 is empty. This signaling system may be accomplished, for example, by using a Hall effect sensor or other proximity switching and/or sensing application. As is known in the art, a Hall effect sensor, e.g., a transducer that varies its output voltage in response to a magnetic field, may be combined with threshold detection so that it acts as a switch.

Figure 23:
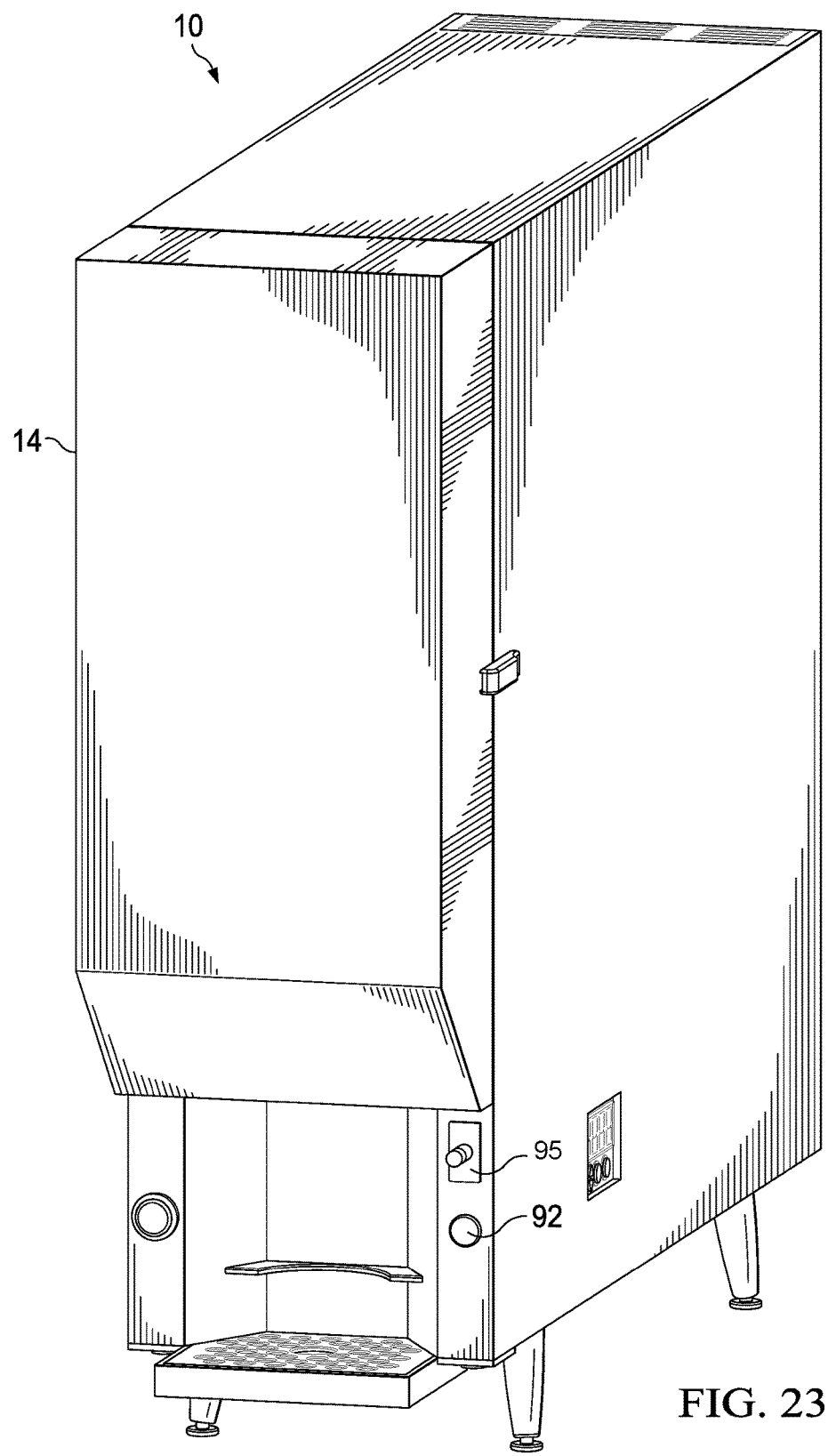
FIG. 23 is a perspective view of an embodiment of the dispenser machine with a disengage switch and an out-of-product indicator light according to the invention disclosed herein.

As previously explained, the roller 68 descends under the force of gravity along the first sidewall 54 to the base 64 of the container tray 24, forcing the soft food or beverage product out of the product container 44 and through the tube spout 66. In the present embodiment, when the roller 68 has reached a position proximate to the base 64 (or a position wherein the soft food or beverage product has been completely or substantially emptied from the product container), a magnetic field generated by a magnetic tip 68a on the end of roller 68 activates at least one Hall effect sensor, i.e., the "out of product" indicator light 92 which is also located proximate to the base as depicted in FIG. 23. As long as the roller 68 (and hence the magnetic tip 68a) remains at a position proximate to the indicator light 92, the indicator light remains "on", thereby alerting the user that the product container 44 is empty.

Referring further to FIG. 23, an embodiment of dispenser 10 is depicted, wherein dispenser 10 includes a disengage switch 95 which may be electrically and/or mechanically coupled to the pump unit and the door 14 of the dispenser 10, so that when the door 14 is in an open position, the disengage switch 95 is triggered, thereby preventing the pump unit from operating. For example, a switch lever or switch-operating latching mechanism may be provided wherein the disengage switch 95 may trigger an "open circuit" condition when the door is unlatched and/or open, thereby preventing operation of the pump unit. Once the door is closed, the switch lever may be moved to close the circuit to operate the motor for the pump unit. Operation of the disengage switch may be accomplished by using any one of a variety of electrical and/or mechanical disengage mechanisms known in the art and the present invention is not intended to be limited to any particular method or mechanism described herein.

Figure 24:
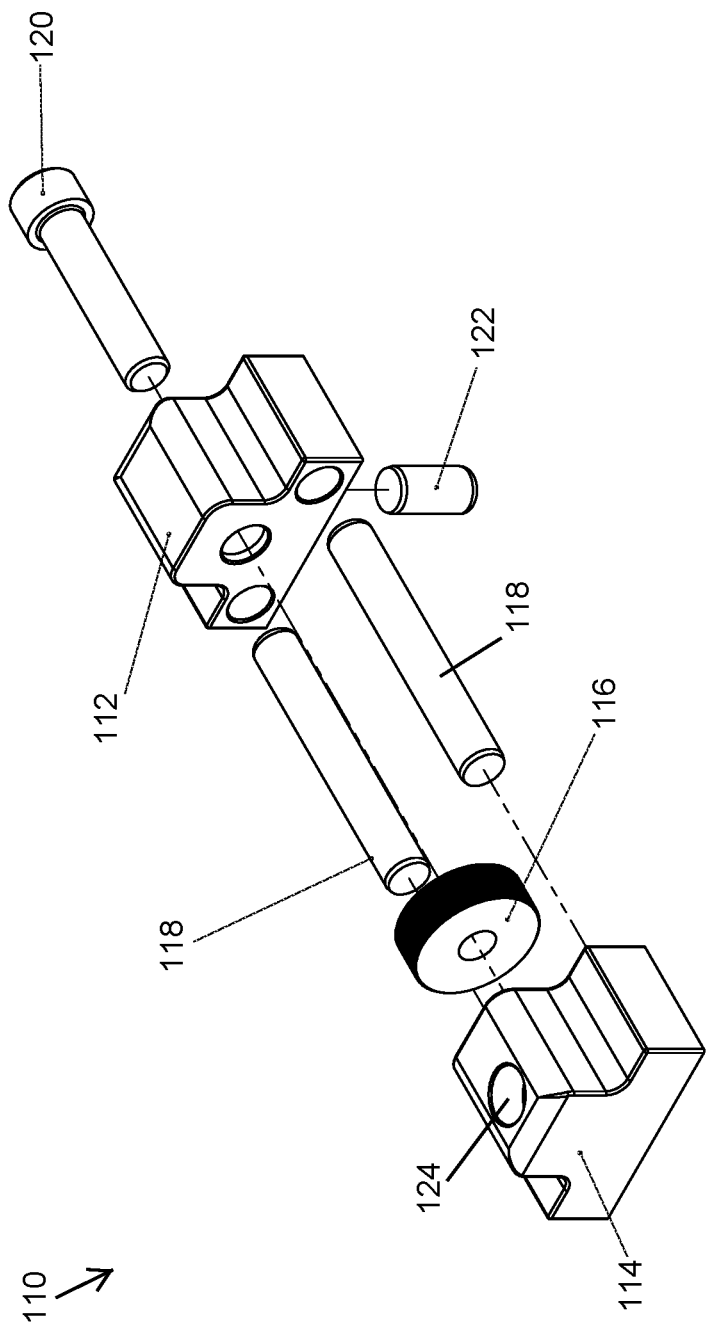
FIG. 24 is an exploded view of an embodiment of an adjustable handle lever of the dispenser machine according to the invention disclosed herein.

Referring now to FIG. 24, an exploded view of an adjustable handle lever 110 of the dispenser machine is shown. Adjustable handle lever 110 may be interchanged with, and/or may be an alternative to, the pinch deck lever 30 of FIGS. 5-8. Adjustable handle lever 110 may comprise a front 112, a back 114, thumb wheel 116, dowel pins 118, socket head cap screw 120, back pin 122, and connecting screw (not shown) adapted to fit in hole 124, which together may be assembled as shown in FIG. 24. In operation, connecting screw (not shown) adapted to fit in hole 124 connects adjustable handle lever 110 to the dispenser machine. Back pin 122 of assembled adjustable handle lever 110 fits into vertical slot 31 of pinch deck 28 (see FIG. 5). Once the adjustable handle lever 110 is fitted onto the pinch deck 28 of the dispenser machine, thumb wheel 116 of adjustable handle lever 110 may be rolled or moved in a first direction (such as an upward direction) to translate the pinch deck 28 closer to the pump disk 74 (thereby increasing the compression applied to the tube spout 66) or in a second direction (such as a downward direction) to translate the pinch deck 28 away from the pump disk 74 (thereby decreasing the compression applied to the tube spout 66). The adjustable handle lever 110 may therefore allow the operator to easily adjust the compressive "pinch" force applied to the tube spout 66, as needed, to control product flow based on the product to be dispensed, i.e., by increasing the compression for thinner, less viscous products, or by decreasing the compression for thicker, more viscous products, without the operator having to manually adjust and/or re-adjust various components of the dispenser machine.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

We claim:

1. A method for dispensing a soft food or beverage product, comprising:
    attaching a product container containing the soft food or beverage product to a container tray housed within a temperature controlled dispenser unit, said product container having a tube spout attached thereto;
    positioning a roller against an exterior surface of the product container;
    retaining the tube spout in proximity between a pump unit and a pinch deck;
    unsealing the tube spout attached to the product container;
    dispensing the soft food or beverage product by actuating the dispenser unit;
    adjusting with an adjustable handle lever the flow rate of the dispensed soft food or beverage product, wherein the adjustable handle lever is fitted into a slot of the pinch deck.

2. The method of claim 1, further comprising:
    activating an indicator light when the product container is substantially empty.

3. The method of claim 1 further comprising:
    providing a heating or cooling circuit to heat or refrigerate the product stored within the product container.

4. The method of claim 1 further comprising:
    providing a heating or cooling circuit to heat or refrigerate the product stored within the tube spout.

5. An apparatus for dispensing a soft food or beverage product, comprising:
    a cabinet with an attached door for forming an enclosure;
    a pinch deck attached to an interior surface of the cabinet;
    a thermal deck attached to the interior surface of the cabinet;
    a pump with at least one or more pump pins attached to a pump disc positioned within the cabinet;
    an adjustable handle lever for controlling flow of the soft food or beverage product wherein the adjustable handle lever is fitted into a slot of the pinch deck;
    a container tray positioned within the cabinet;
    a product container containing the soft food or beverage product attached to the container tray, the product container having a tube spout;
    a roller having a first end and a second end, wherein the roller is positioned to be in contact with an external surface of the product container.

6. The apparatus of claim 5, wherein the container tray further comprises:
a base with a first sidewall, a second sidewall, a front endwall, and a rear endwall, wherein a pair of guide slots is formed in the front endwall and the rear endwall.

7. The apparatus of claim 6, wherein the first end and the second end of the roller are inserted into the pair of guide slots in the front endwall and the rear endwall of the container tray.

8. The apparatus of claim 6, wherein the base is curved.

9. The apparatus of claim 6, wherein the first endwall and second endwall are angled outward from the base.

10. The apparatus of claim 5, further comprising:
a disengage switch which prohibits operation of the pump when the door of the cabinet is in an open position.

11. The apparatus of claim 5, wherein the thermal deck is in thermal communication with a thermal circuit and provides thermal energy for heating or cooling the soft food or beverage product located within the tube spout.

12. The apparatus of claim 5, further comprising:
a thermal cooling circuit for cooling the soft food or beverage product stored within the cabinet.

13. The apparatus of claim 5, further comprising:
a thermal heating circuit for heating the soft food or beverage product stored within the cabinet.

14. The apparatus of claim 5, further comprising:
a control panel for controlling a temperature of the soft food or beverage product stored within the cabinet.

15. The apparatus of claim 5, wherein the adjustable handle lever further comprises:
a thumb wheel.

16. The apparatus of claim 15, wherein rotation of the thumb wheel in a first direction translates the pinch deck toward the pump unit and in a second direction translates the pinch deck away from the pump unit.

17. The apparatus of claim 16 wherein the rotation of the thumb wheel in the first direction decreases flow of the soft food or beverage product and in the second direction increases flow of the soft food or beverage product.

* * * * *